US011686872B2

(12) United States Patent
Diallo et al.

(10) Patent No.: US 11,686,872 B2
(45) Date of Patent: Jun. 27, 2023

(54) ATTENUATION OF GUIDED WAVES USING POLARIZATION FILTERING

(71) Applicant: Saudi Arabian Oil Company, Dhahran (SA)

(72) Inventors: Mamadou Sanou Diallo, Dhahran (SA); Mustafa Al-Marzooq, Awjam (SA)

(73) Assignee: Saudi Arabian Oil Company, Dhahran (SA)

( * ) Notice: Subject to any disclaimer, the term of this patent is extended or adjusted under 35 U.S.C. 154(b) by 768 days.

(21) Appl. No.: 16/725,664

(22) Filed: Dec. 23, 2019

(65) Prior Publication Data

US 2021/0190984 A1    Jun. 24, 2021

(51) Int. Cl.
*G01V 1/36* (2006.01)

(52) U.S. Cl.
CPC ...... *G01V 1/364* (2013.01); *G01V 2210/3246* (2013.01)

(58) Field of Classification Search
CPC .................. G01V 1/364; G01V 2210/3264
See application file for complete search history.

(56) References Cited

U.S. PATENT DOCUMENTS

| 4,757,480 A * | 7/1988 | Gutowski ............ G01V 1/364 367/63 |
| 5,781,502 A | 7/1998 | Becquey |
| 8,352,192 B2 | 1/2013 | Diallo et al. |
| 8,553,497 B2 | 10/2013 | Krohn |
| 2011/0004409 A1 | 1/2011 | Diallo et al. |

(Continued)

FOREIGN PATENT DOCUMENTS

| CN | 101915939 A | 12/2010 |
| CN | 102338886 A | 2/2012 |

(Continued)

OTHER PUBLICATIONS

Diallo et al., "Scholte Wave Attenuation with Polarization Filtering using Pressure and Vertical Geophone Sensors", ITPC (International Petroleum Technology Conference Mar. 26-28, 2019. (Year: 2019).*

(Continued)

*Primary Examiner* — Krystine E Breier
(74) *Attorney, Agent, or Firm* — Bracewell LLP; Constance G. Rhebergen; Brian H. Tompkins

(57) ABSTRACT

Systems, methods, and computer-readable media for attenuating guided waves in seismic data using polarization filtering are provided. A raw hydrophone component and raw geophone component of multicomponent seismic data may be scaled using a constant scalar to enhance the ellipticity ratio of guided waves. Polarization filtering based on the ellipticity ratio may be applied within a velocity constraint to the scaled hydrophone and vertical geophone components to attenuate the guided waves. Additionally or alternatively, polarization filtering based on the tilt angle may be applied within a velocity constraint to the raw hydrophone and vertical geophone components to attenuate the guided waves. Polarization filtering may be applied to a raw hydrophone component and raw vertical geophone component of seismic data to attenuate Scholte waves before attenuation of the guided waves.

26 Claims, 17 Drawing Sheets

(56) References Cited

U.S. PATENT DOCUMENTS

2012/0250460 A1   10/2012  Edme et al.
2014/0288843 A1    9/2014  De Meersman et al.
2019/0094400 A1    3/2019  Lu et al.

FOREIGN PATENT DOCUMENTS

CN          105652322 A     6/2016
WO     WO-2009120430 A1 *  10/2009  ............. G01V 1/284

OTHER PUBLICATIONS

Mars et at., "Advanced Signal Processing Tools for dispersive waves", Near Surface Geophysics, 2004 (Year: 2004).*

International Search Report and Written Opinion for International Application No. PCT/US2020/066962 dated Apr. 12, 2021; pp. 1-18.

Diallo, M.S. et al.; "Instantaneous polarization attributes in the time-frequency domain and wavefield separation" Geophysical Prospecting, 2005, 53; pp. 723-731.

Diallo, M.S. et al.; "Scholte Wave attenuation with Polarization Filtering Using Pressure and Vertical Geophone sensors" IPTC (International Petroleum Technology Conference) 2019; pp. 1-3.

Diallo, Mamadou S. et al.; Poster for "Scholte Wave Attenuation with Polarization Filtering using Pressure and Vertical Geophone Sensors" Saudi Aramco, 2019; pp. 1-9.

Ernst, Fabian E. et al.; "Removal of scattered guided waves from seismic data" Geophysics, vol. 067, No. 4 (Jul.-Aug. 2002); pp. 1240-1248.

Mars, J.I. et al.; "Advanced signal processing tools for dispersive waves" Near Surface Geophysics, 2004, pp. 199-210.

* cited by examiner

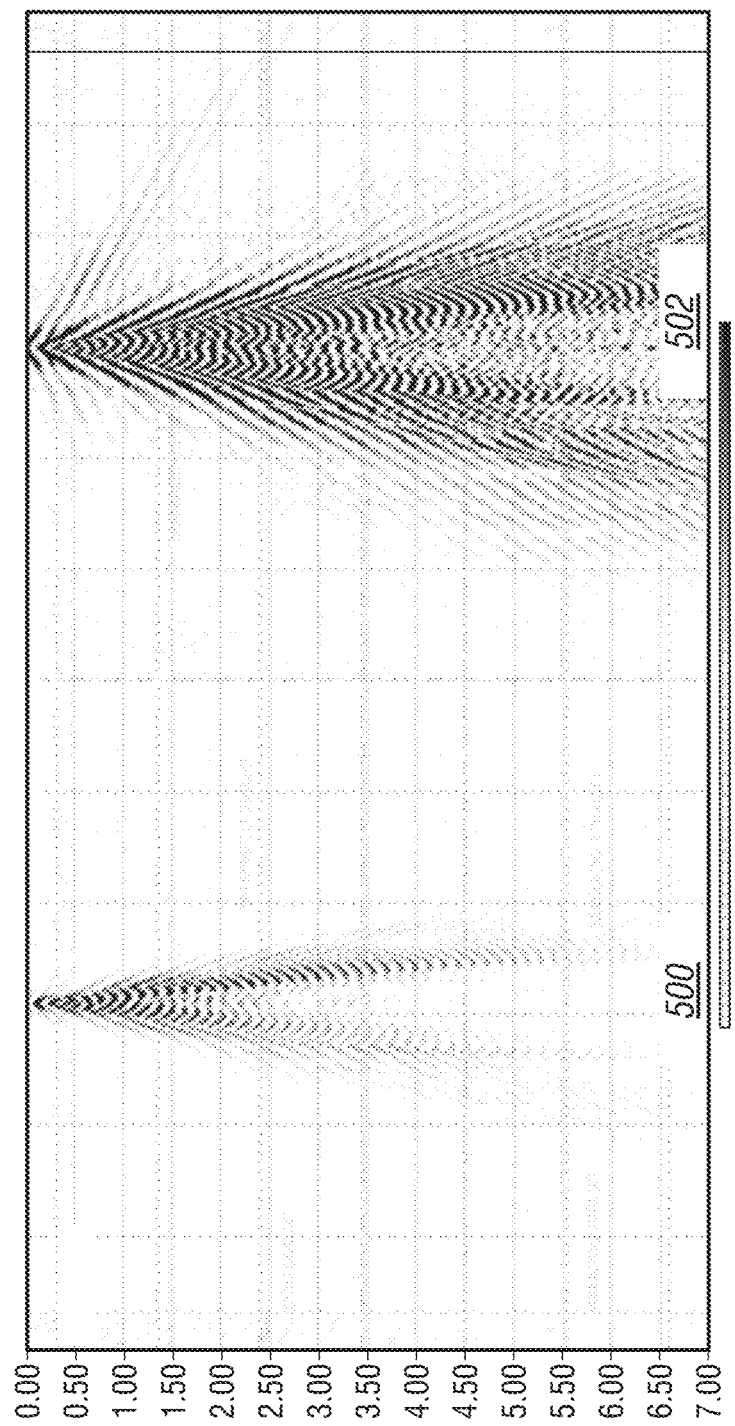

ATTENUATION OF GUIDED WAVES USING POLARIZATION FILTERING

BACKGROUND

Field of the Disclosure

The present disclosure generally relates to geophysical exploration using seismic surveying. More specifically, embodiments of the disclosure relate to the attenuation of noise from guided waves.

Description of the Related Art

In geophysical exploration, such as the exploration for hydrocarbons, seismic surveys are performed to produce images of the various rock formations in the earth ("subsurface") or underwater ("subsea"). The seismic surveys obtain seismic data indicating the response of the rock formations to the travel of elastic wave seismic energy. Various types of seismic waves may be generated as the seismic data, and such seismic waves include interface waves produced at the interface between different waves. These interface waves include Rayleigh waves and Scholte waves. Various techniques may be used to filter these interface waves from the seismic data. However, existing filtering techniques may be unable to filter other types of waves that are a source of noise in the seismic data.

SUMMARY

In a marine environment, guided waves are generated as a consequence of constructive interference of plane waves undergoing multiple reflections between the free surface and water bottom at angles of incidence beyond the critical angle. Polarization filtering is typically used to filter interface waves such as Rayleigh waves (in land environments) and Scholte waves (in marine environments) from multicomponent seismic data. Interface waves such as Rayleigh and Scholte waves exhibit a distinctive characteristic—elliptical polarization—that may be exploited to filter these waves from body waves that are typically linearly polarized. However, guided waves do not exhibit such distinctive elliptical polarization characteristics relative to body waves. Consequently, guided waves may be difficult or impossible to filter from multicomponent seismic data, resulting in excessive noise in seismic images that affects accurate characterization of rock formations and hydrocarbon reservoirs in such formations.

In one embodiment, a computer-implemented method for producing attenuated seismic data from raw seismic data generated from seismic receiver station configured to sense seismic signals originating from a seismic source station. The seismic receiver station includes a geophone and a hydrophone. The method includes obtaining raw seismic data from the seismic receiver station, the raw seismic data having a hydrophone component and a vertical geophone component, and scaling the raw seismic data to produce scaled seismic data having a scaled hydrophone component and a scaled vertical geophone component. The method further includes applying polarization filtering within a frequency band defined by a first velocity and a second velocity to the scaled seismic data, the polarization filtering based on an ellipticity ratio, such that the polarization filtering attenuates guided waves in the scaled seismic data. The method also includes producing attenuated seismic data from the application of polarization filtering, such that the attenuated seismic data has attenuated guided waves as compared to the raw seismic data.

In some embodiments, the method includes generating a seismic image from the attenuated seismic data. In some embodiments, the method includes removing the scaling from the attenuated seismic data. In some embodiments, the scaling is performed using a constant scalar. In some embodiments, the method includes applying polarization filtering to the raw seismic data before the scaling, such that polarization filtering attenuates Scholte waves in the raw seismic data. In some embodiments, the method includes applying a polarization filtering to the attenuated seismic data within a frequency band defined by a third velocity and a fourth velocity and based on a tilt angle, such that the polarization filtering attenuates guided waves in the attenuated seismic data.

In another embodiment, a transitory computer-readable storage medium having executable code stored thereon for producing attenuated seismic data from seismic data generated from a seismic receiver station configured to sense seismic signals originating from a seismic source station is provided. The seismic receiver station includes a geophone and a hydrophone. The executable code includes a set of instructions that causes a processor to perform operations that include obtaining raw seismic data from the seismic receiver station, the raw seismic data having a hydrophone component and a vertical geophone component, and scaling the raw seismic data to produce scaled seismic data having a scaled hydrophone component and a scaled vertical geophone component. The operations further include applying polarization filtering within a frequency band defined by a first velocity and a second velocity to the scaled seismic data, the polarization filtering based on an ellipticity ratio, such that the polarization filtering attenuates guided waves in the scaled seismic data. The operations also include producing attenuated seismic data from the application of polarization filtering, such that the attenuated seismic data has attenuated guided waves as compared to the raw seismic data.

In some embodiments, the operations include generating a seismic image from the attenuated seismic data. In some embodiments, the operations include removing the scaling from the attenuated seismic data. In some embodiments, the scaling is performed using a constant scalar. In some embodiments, the operations include applying polarization filtering to the raw seismic data before the scaling, such that polarization filtering attenuates Scholte waves in the raw seismic data. In some embodiments, the operations include applying a polarization filtering to the attenuated seismic data within a frequency band defined by a third velocity and a fourth velocity and based on a tilt angle, such that the polarization filtering attenuates guided waves in the attenuated seismic data.

In another embodiment, a system is provided that includes a seismic source station and a seismic receiver station configured to sense seismic signals originating from the seismic source station, the seismic receiver station having a geophone and a hydrophone. The system further includes a seismic data processor and a non-transitory computer-readable storage memory accessible by the seismic data processor and having executable code stored thereon for producing attenuated seismic data from seismic data generated from the seismic receiver station. The executable code includes a set of instructions that causes a processor to perform operations that include obtaining raw seismic data from the seismic receiver station, the raw seismic data having a hydrophone component and a vertical geophone component, and scaling the raw seismic data to produce scaled seismic data having a scaled hydrophone component and a scaled vertical geophone component. The operations further include applying polarization filtering within a frequency band defined by a first velocity and a second velocity to the scaled seismic data, the polarization filtering based on an ellipticity ratio, such that the polarization filtering attenuates guided waves in the scaled seismic data. The operations also include producing attenuated seismic data from the application of polarization filtering, such that the attenuated seismic data has attenuated guided waves as compared to the raw seismic data.

In some embodiments, the operations include generating a seismic image from the attenuated seismic data. In some embodiments, the operations include removing the scaling from the attenuated seismic data. In some embodiments, the scaling is performed using a constant scalar. In some embodiments, the operations include applying polarization filtering to the raw seismic data before the scaling, such that polarization filtering attenuates Scholte waves in the raw seismic data. In some embodiments, the operations include applying a polarization filtering to the raw seismic data within a frequency band defined by a third velocity and a fourth velocity and based on a tilt angle, such that the polarization filtering attenuates guided waves in the attenuated seismic data.

In one embodiment, a computer-implemented method for producing attenuated seismic data from raw seismic data generated from seismic receiver station configured to sense seismic signals originating from a seismic source station. The seismic receiver station includes a geophone and a hydrophone. The method includes obtaining raw seismic data from the seismic receiver station, the raw seismic data having a hydrophone component and a vertical geophone component and applying a polarization filtering to the raw seismic data within a frequency band defined by a first velocity and a second velocity and based on a tilt angle, such that the polarization filtering attenuates guided waves in the scaled seismic data. The method further includes producing attenuated seismic data from the application of polarization filtering, such that the attenuated seismic data has attenuated guided waves as compared to the raw seismic data.

In some embodiments, the method includes generating a seismic image from the attenuated seismic data. In some embodiments, the polarization filtering is a first polarization filtering and the method includes applying a second polarization filtering to the raw seismic data before the first polarization filtering, such that the second polarization filtering attenuates Scholte waves in the raw seismic data. In some embodiments, the method includes scaling the attenuated seismic data to produce scaled seismic data having a scaled hydrophone component and a scaled vertical geophone component and applying polarization filtering within a frequency band defined by a third velocity and a fourth velocity to the scaled seismic data, the polarization filtering based on an ellipticity ratio, such that the polarization filtering attenuates guided waves in the scaled seismic data.

In another embodiment, a transitory computer-readable storage medium having executable code stored thereon for producing attenuated seismic data from seismic data generated from a seismic receiver station configured to sense seismic signals originating from a seismic source station is provided. The seismic receiver station includes a geophone and a hydrophone. The executable code includes a set of instructions that causes a processor to perform operations that include obtaining raw seismic data from the seismic receiver station, the raw seismic data having a hydrophone component and a vertical geophone component, and applying a polarization filtering to the raw seismic data within a frequency band defined by a first velocity and a second velocity and based on a tilt angle, such that the polarization filtering attenuates guided waves in the scaled seismic data. The operations further include producing attenuated seismic data from the application of polarization filtering, such that the attenuated seismic data has attenuated guided waves as compared to the raw seismic data.

In some embodiments, the operations include generating a seismic image from the attenuated seismic data. In some embodiments, the polarization filtering is a first polarization filtering and the operations include applying a second polarization filtering to the raw seismic data before the first polarization filtering, such that the second polarization filtering attenuates Scholte waves in the raw seismic data. In some embodiments, the operations include scaling the attenuated seismic data to produce scaled seismic data having a scaled hydrophone component and a scaled vertical geophone component and applying polarization filtering within a frequency band defined by a third velocity and a fourth velocity to the scaled seismic data, the polarization filtering based on an ellipticity ratio, such that the polarization filtering attenuates guided waves in the scaled seismic data.

In another embodiment, a system is provided that includes a seismic source station and a seismic receiver station configured to sense seismic signals originating from the seismic source station, the seismic receiver station having a geophone and a hydrophone. The system further includes a seismic data processor and a non-transitory computer-readable storage memory accessible by the seismic data processor and having executable code stored thereon for producing attenuated seismic data from seismic data generated from the seismic receiver station. The executable code includes a set of instructions that causes a processor to perform operations that include obtaining raw seismic data from the seismic receiver station, the raw seismic data having a hydrophone component and a vertical geophone component, and applying a polarization filtering to the raw seismic data within a frequency band defined by a first velocity and a second velocity and based on a tilt angle, such that the polarization filtering attenuates guided waves in the scaled seismic data. The operations further include producing attenuated seismic data from the application of polarization filtering, such that the attenuated seismic data has attenuated guided waves as compared to the raw seismic data.

In some embodiments, the operations include generating a seismic image from the attenuated seismic data. In some embodiments, the polarization filtering is a first polarization filtering and the operations include applying a second polarization filtering to the raw seismic data before the first polarization filtering, such that the second polarization filtering attenuates Scholte waves in the raw seismic data. In some embodiments, the operations include scaling the attenuated seismic data to produce scaled seismic data having a scaled hydrophone component and a scaled vertical geophone component and applying polarization filtering within a frequency band defined by a third velocity and a fourth velocity to the scaled seismic data, the polarization filtering based on an ellipticity ratio, such that the polarization filtering attenuates guided waves in the scaled seismic data.

BRIEF DESCRIPTION OF THE DRAWINGS

FIG. 5 depicts the hydrophone component and vertical geophone component of the multicomponent seismic data generated by subtracting the attenuated seismic data depicted in FIG. 4 from the raw seismic data depicted in FIG. 1 in accordance with an embodiment of the disclosure;

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include systems, methods, and computer-readable media for attenuating guided waves in seismic data using polarization filtering. In some embodiments, a raw hydrophone component and raw geophone component of seismic data may be scaled using a constant scalar to enhance the ellipticity ratio of the guided waves and the contrast between the reflection arrivals and the guided waves. After scaling, polarization filtering based on the ellipticity ratio may be applied within a velocity constraint to the scaled hydrophone and vertical geophone components to attenuate the guided waves. The polarization filtering may produce multicomponent seismic data with reduced or removed noise from the guided waves.

In some embodiments, polarization filtering may be applied to a raw hydrophone component and raw vertical geophone component of seismic data to attenuate Scholte waves before attenuation of the guided waves.

In some embodiments, polarization filtering based on the tilt angle may be applied within a velocity constraint to the raw (unscaled) hydrophone and vertical geophone components to attenuate the guided waves. Here again, the polarization filtering may produce multicomponent seismic data with reduced or removed noise from the guided waves.

Figure 1:
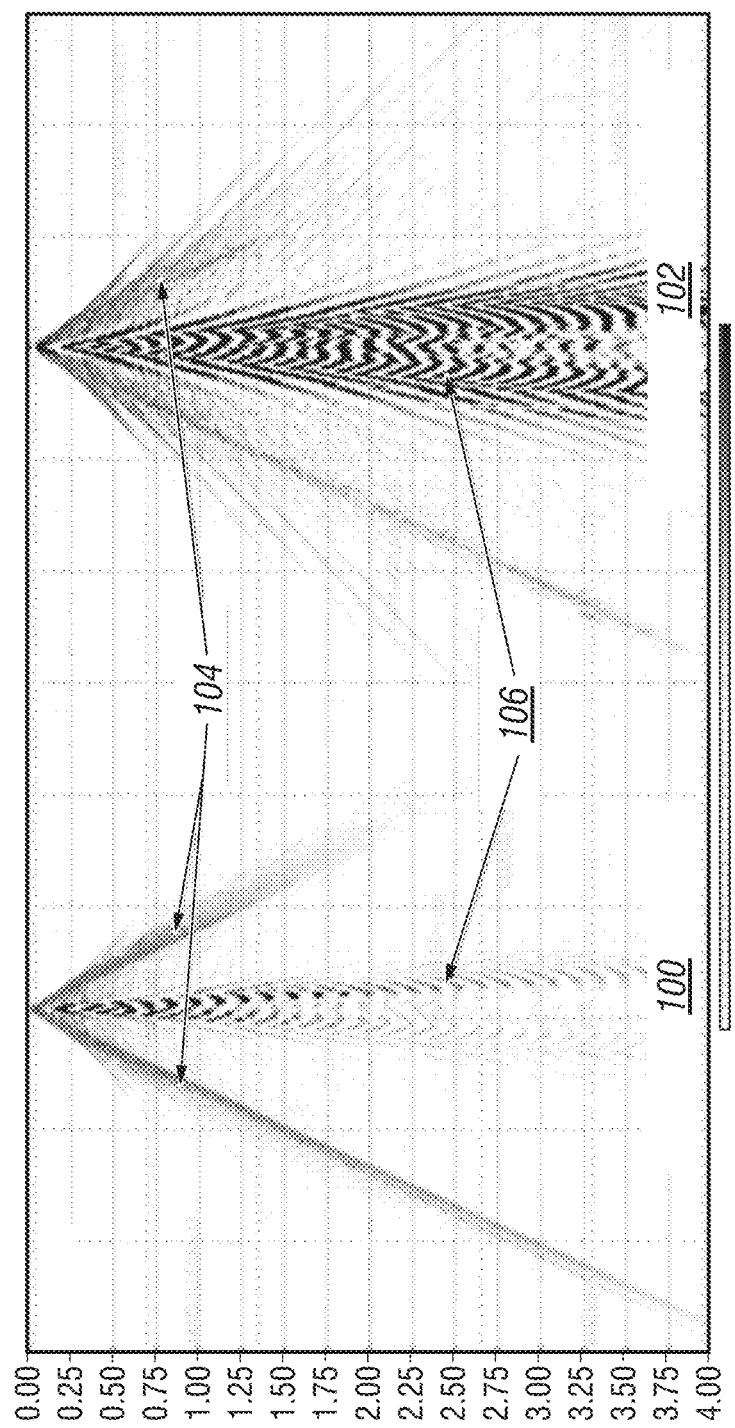
FIG. 1 depicts example raw receiver gathers for a hydrophone component and a vertical geophone component of multicomponent seismic data obtained in a seismic exploration operation using an ocean bottom cable (OBC) in a marine environment in accordance with an embodiment of the disclosure.

In some embodiments the guided waves in the multicomponent seismic data may be attenuated using a sequential combination of polarization filtering based on the tilt angle applied to the raw hydrophone and vertical geophone components and polarization filtering based on the ellipticity ratio applied to the scaled hydrophone and vertical geophone components. For example, in some embodiments, the guided waves in the multicomponent seismic data may first be attenuated using polarization filtering based on the ellipticity ratio applied to the scaled hydrophone and vertical geophone components. In this example, the attenuated seismic data may then be attenuated in a second pass of polarization filtering based on the tilt angle applied to the attenuated hydrophone and vertical geophone components. In another example, the guided waves in the multicomponent seismic data may first be attenuated using polarization filtering based on the tilt angle applied to the raw hydrophone and vertical geophone components. In this example, As mentioned in the disclosure, interface waves (that is, Scholte waves in marine environments) may be filtered using polarization filtering due to the distinctive elliptical polarization characteristics relative to desired signal waves. For example, FIGS. 1-5 illustrate an application of polarization filtering to seismic data to attenuate Scholte waves. FIG. 1 depicts an example raw receiver gathers for a hydrophone component (100) and a vertical geophone component (102) of multicomponent seismic data obtained from an ocean bottom cable in a seismic exploration operation in a marine environment. The raw receiver gathers shown in FIG. 1 includes guided waves 104 and Scholte waves 106.

Figure 2:
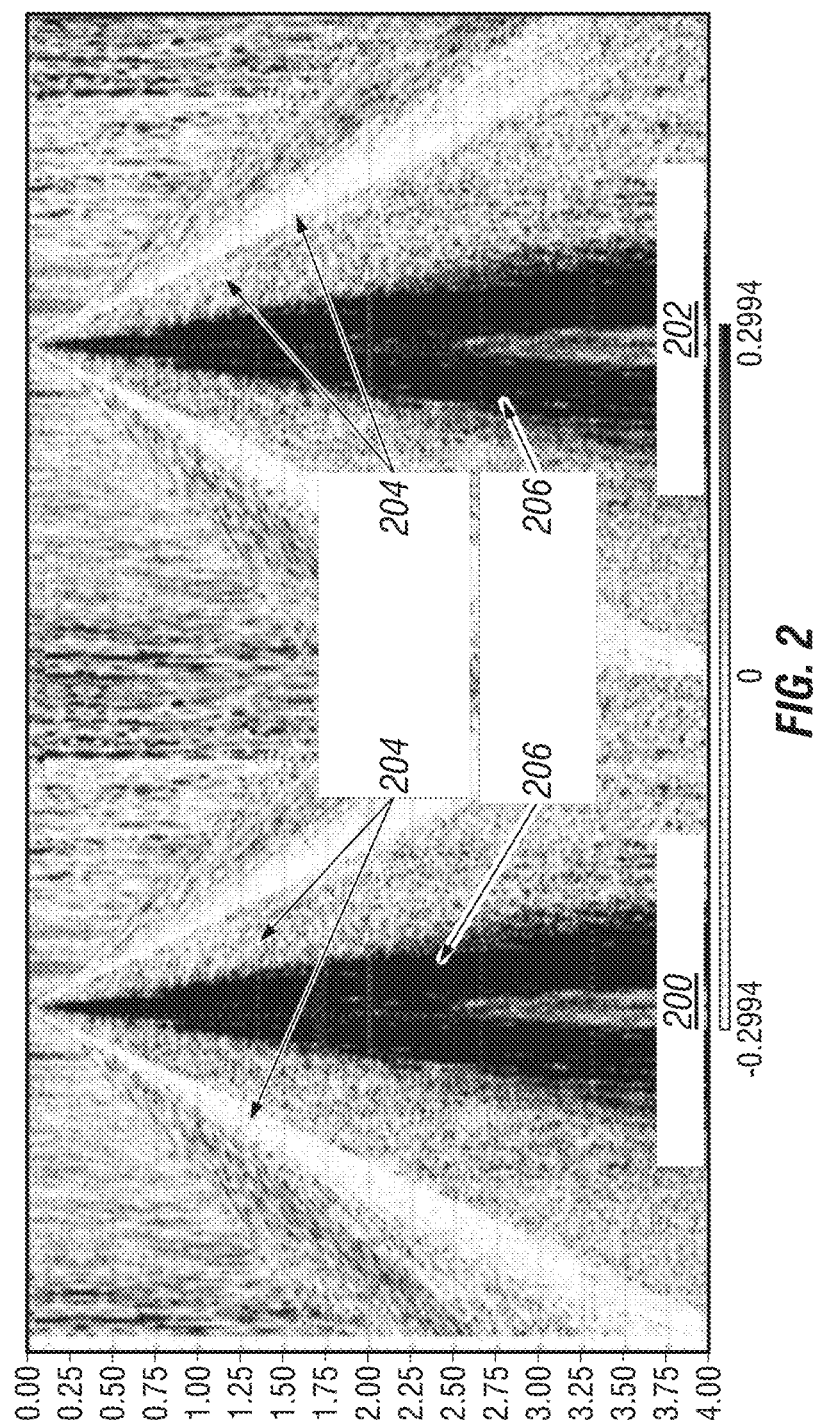
FIG. 2 depicts determined ellipticity ratios from the raw hydrophone component and the raw vertical geophone component of FIG. 1 in accordance with an embodiment of the disclosure.

FIG. 2 depicts determined ellipticity ratios from the hydrophone component (200) and the vertical geophone component (202) respectively of the raw receiver gathers depicted in FIG. 1. FIG. 2 depicts the ellipticity ratio 204 of the guided waves and the ellipticity ratio 206 of the Scholte waves. As shown in FIG. 2, the ellipticity ratio 204 of the guided waves is relatively small (that is, the guided waves exhibit a linear polarization) and the ellipticity ratio 206 of the Scholte waves is relatively large (that is, the Scholte waves exhibit an elliptical polarization).

Figure 3:
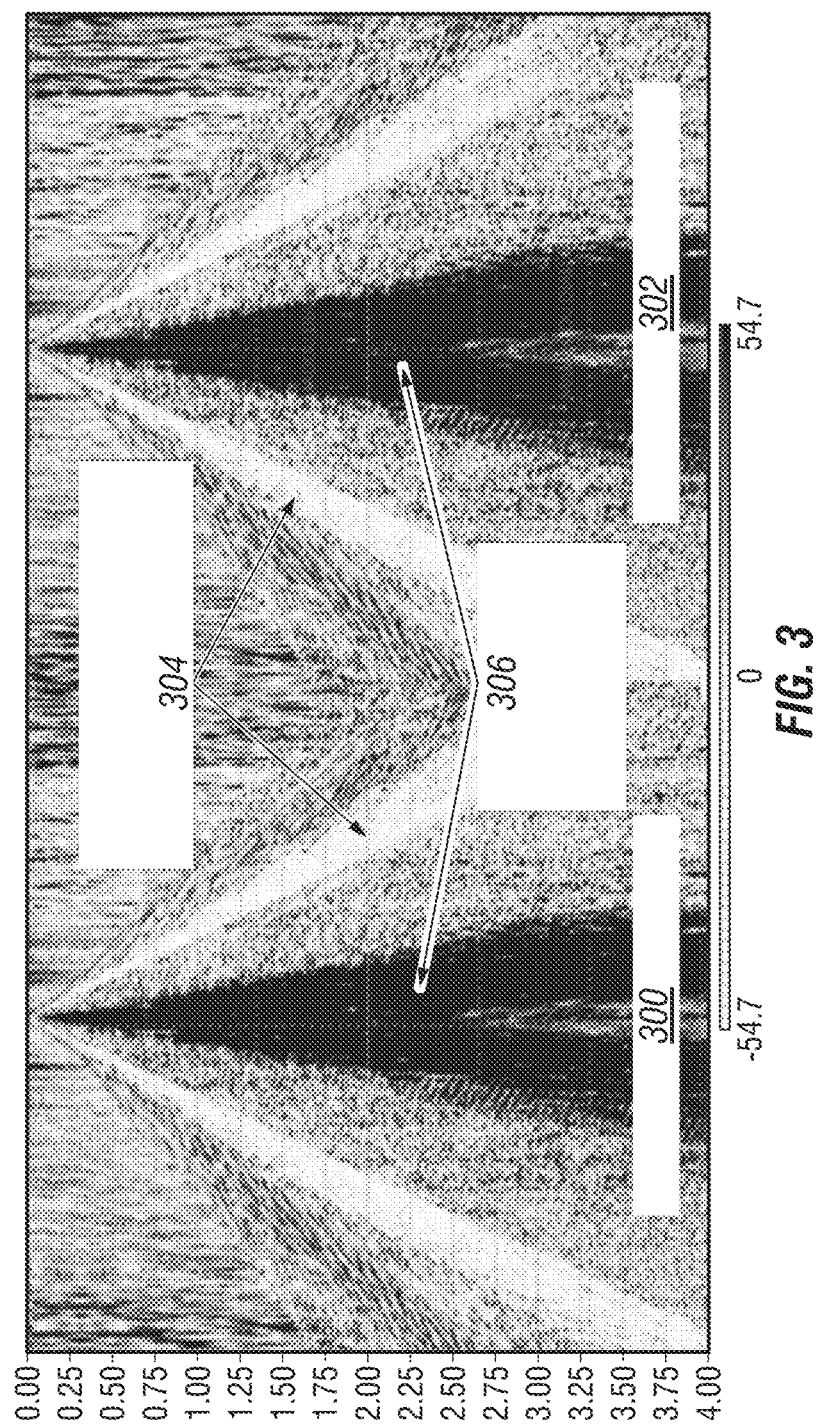
FIG. 3 depicts determined tilt angles from the raw hydrophone component and the raw vertical geophone component of FIG. 1 in accordance with an embodiment of the disclosure.

FIG. 3 depicts determined tilt angles from the hydrophone component (300) and the vertical geophone component (302) respectively of the raw receiver gathers depicted in FIG. 1. FIG. 3 depicts the tilt angle 304 of the guided waves and the tilt angle 306 of the Scholte waves. As shown in FIG. 3, the tilt angle 304 of the guided waves is relatively small and is in a horizontal polarization direction. In contrast, the tilt angle 306 of the Scholte waves is relatively large and is in a vertical polarization direction.

Figure 4:
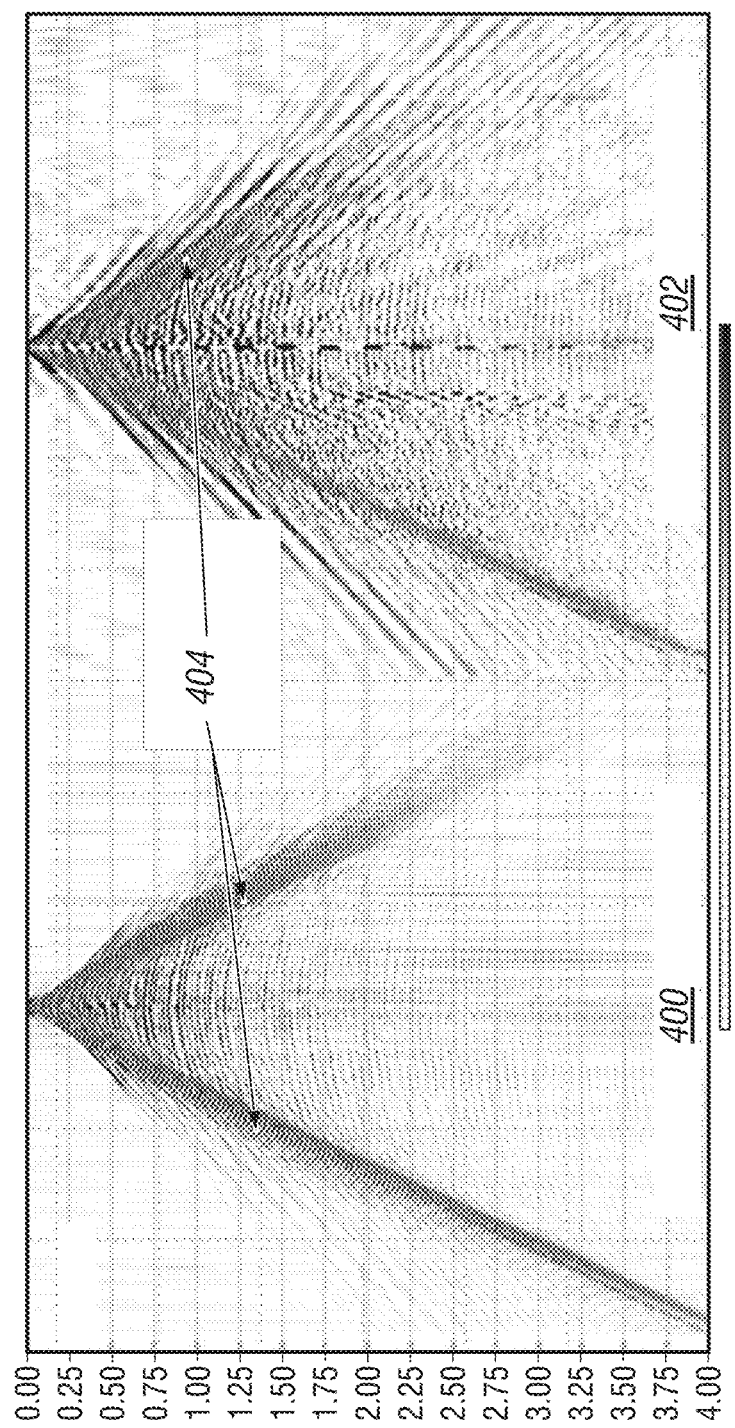
FIG. 4 depicts a hydrophone component and vertical geophone component of multicomponent seismic data after attenuation of the Scholte waves from the raw hydrophone and geophone components of FIG. 1 using polarization filtering in accordance with an embodiment of the disclosure.

Polarization filtering may be applied to the hydrophone component and the vertical geophone component to attenuate Scholte waves based on the ellipticity ratio 206 shown in FIG. 2. FIG. 4 depicts the hydrophone component (400) and vertical geophone component (402) of the multicomponent seismic data after attenuation of the Scholte waves in the raw receiver gathers depicted in FIG. 1 using polarization filtering. As shown in FIG. 4, the guided waves 404 are not attenuated by the polarization filtering applied to the multicomponent seismic data, as the linear polarization exhibited by the guided waves is unsuitable for polarization filtering.

FIG. 5 depicts the hydrophone component (500) and vertical geophone component (502) of the multicomponent seismic data generated by subtracting the attenuated seismic data depicted in FIG. 4 from the raw receiver gathers depicted in FIG. 1. As shown in FIG. 5, the attenuated noise is dominated by the Scholte waves, whereas the attenuated noise does not include the relatively large amplitude guided waves. The amplitude of the guided waves is relatively large in the hydrophone component of the seismic data and relatively small in the geophone (directional) component. The hydrophone component shows the very significant component of the guided waves in the water column along with other wave types. Because the guided waves are confined within the water layer of the seismic exploration, only minute fractions of the guides waves' energy enters (leaks into) the solid medium recorded in the geophone (directional) components, resulting in the relatively small amplitude in this component.

As described above, conventional polarization filtering based on ellipticity ratio does not attenuate guided waves in the seismic data. Accordingly, embodiments of the disclosure include the attenuation of guided waves using polarization filtering based on ellipticity ratio (as applied to scaled seismic data) or tilt angle. The phase difference between the guided waves in the water column (recorded in the hydrophone component) and the attenuated "leaky" portion of the guided waves (recorded in the geophone component) may be used in the application of polarization filtering. As discussed below, the seismic data may be scaled to enhance the "leaky" portion of the guided waves in the geophone component to a comparable amplitude, and the phase difference may then be used to perform polarization filtering. Additionally or alternatively, polarization filtering may be applied based on a tilt angle of the guided waves.

Figure 6A:
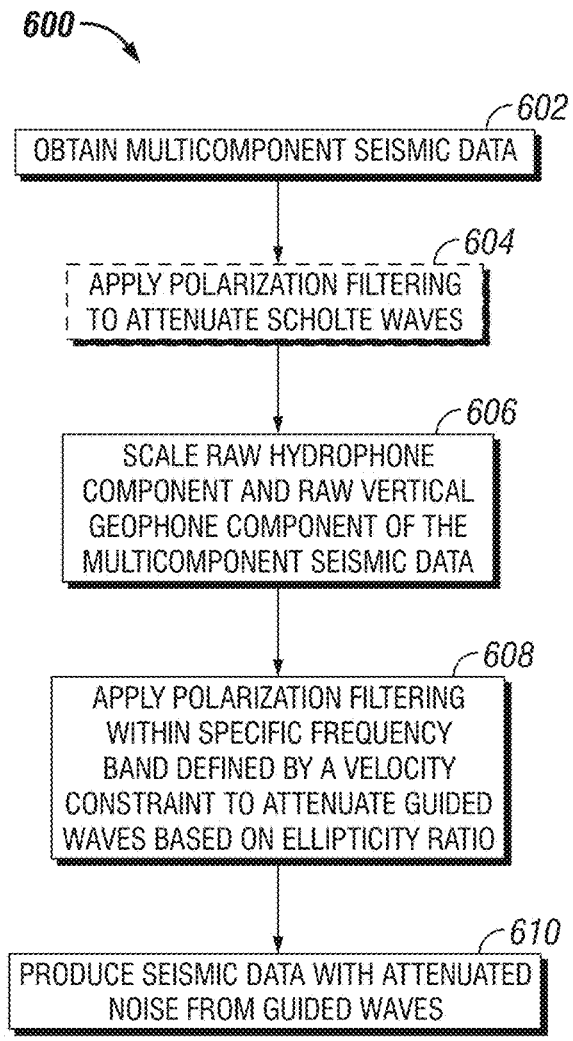
FIGS. 6A, 6B, 6C, and 6D are block diagrams of processes for attenuating guided waves in multicomponent seismic data in accordance with an embodiment of the disclosure.
Figure 6B:
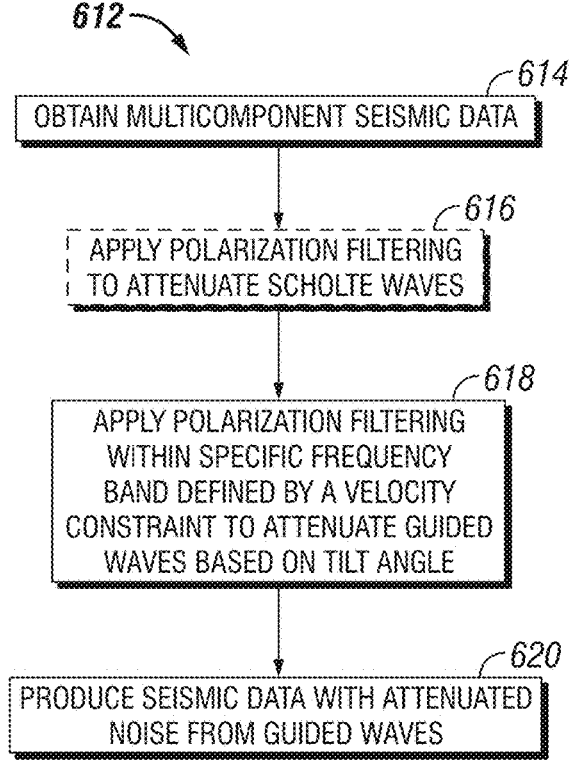
Figure 6C:
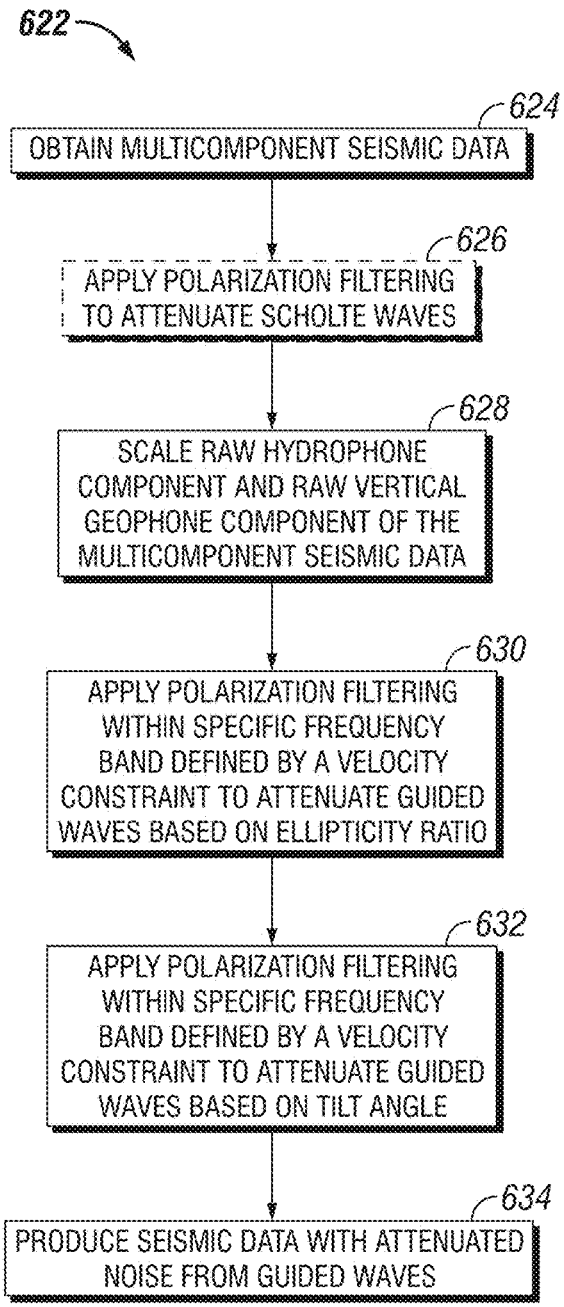
Figure 6D:
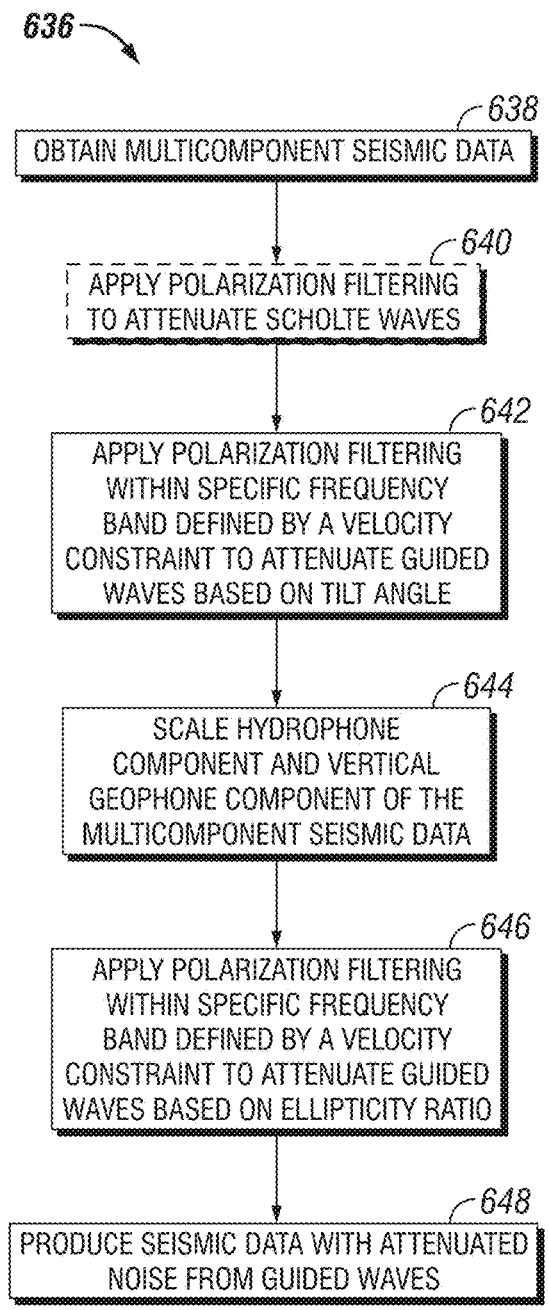

FIGS. 6A, 6B, 6C, and 6D depict processes for attenuating guided waves in multicomponent seismic data in accordance with embodiments of the disclosure. FIG. 6A depicts a process for attenuating guided waves in multicomponent seismic data using polarization filtering based on the ellipticity ratio. FIG. 6B depicts a process for attenuating guided waves in multicomponent seismic data using polarization filtering based on the tilt angle. FIG. 6C depicts a process for attenuating guided waves in multicomponent seismic data using a first pass of polarization filtering based on the ellipticity ratio and a second pass of polarization filtering based on the tilt angle. FIG. 6D depicts a process for attenuating guided waves in multicomponent seismic data using a first pass of polarization filtering based on the tilt angle and a second pass of polarization filtering based on the ellipticity ratio.

Figure 7:
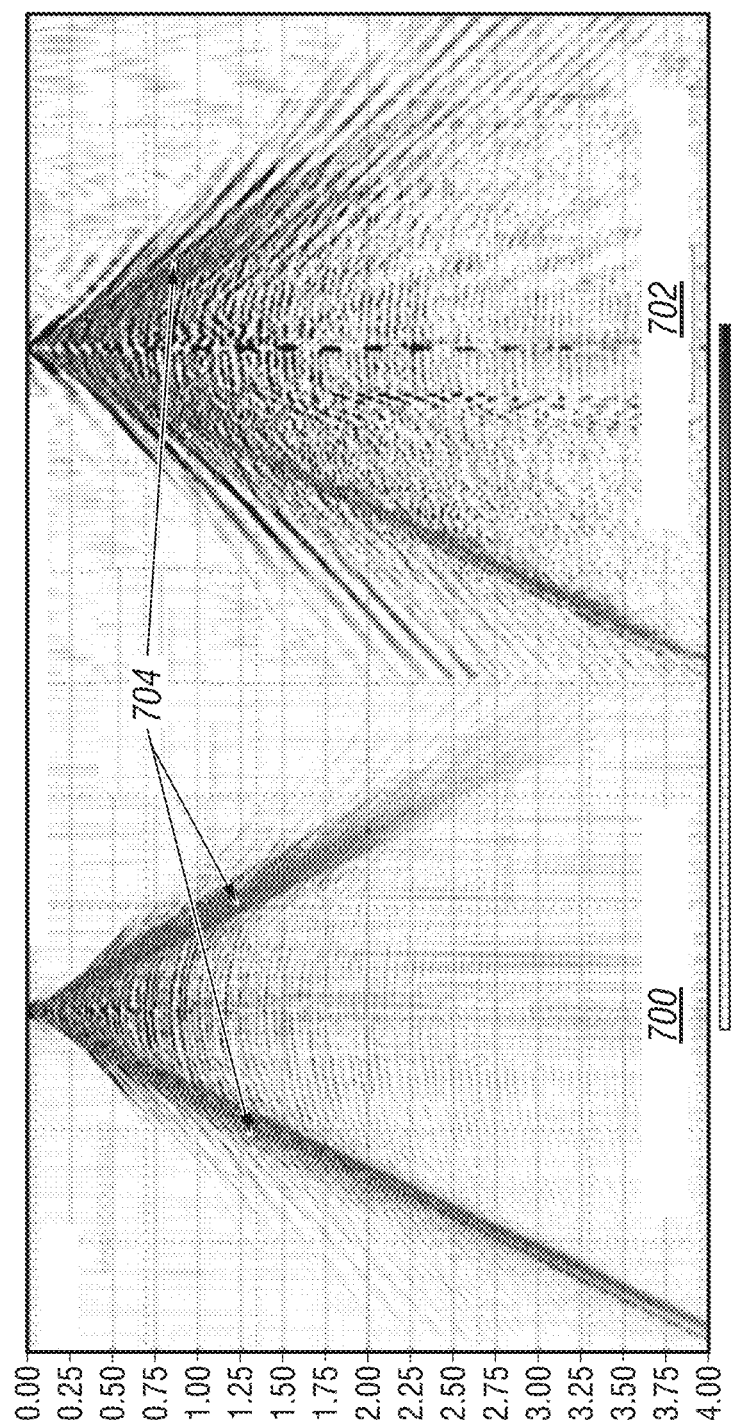
FIG. 7 depicts example raw receiver gathers for a hydrophone component and a vertical geophone component of multicomponent seismic data in accordance with an embodiment of the disclosure.

FIG. 6A depicts a process 600 for attenuating guided waves in multicomponent seismic data using polarization filtering based on the ellipticity ratio in accordance with an embodiment of the disclosure. The process 600 is also described with reference to FIGS. 7-12. Initially, raw multicomponent seismic data (for example, raw receiver gathers or traces) is obtained (block 602). The multicomponent seismic data may include a hydrophone component and a vertical geophone component. FIG. 7 depicts example raw receiver gathers for a hydrophone component (700) and a vertical geophone component (702) of multicomponent seismic data. FIG. 7 also depicts the guided waves 704 in the hydrophone component (700) and vertical geophone component (702) that are attenuated according to the techniques described in the disclosure.

In some embodiments, polarization filtering may be applied to attenuate Scholte waves in the multicomponent seismic data (block 604) before the attenuation of guided waves. As discussed supra, polarization filtering using the ellipticity ratio may be applied to the raw hydrophone component and vertical geophone component to attenuation the Scholte waves. In other embodiments, the process 600 for attenuating guided waves may not include the attenuation of Scholte waves.

Figure 8:
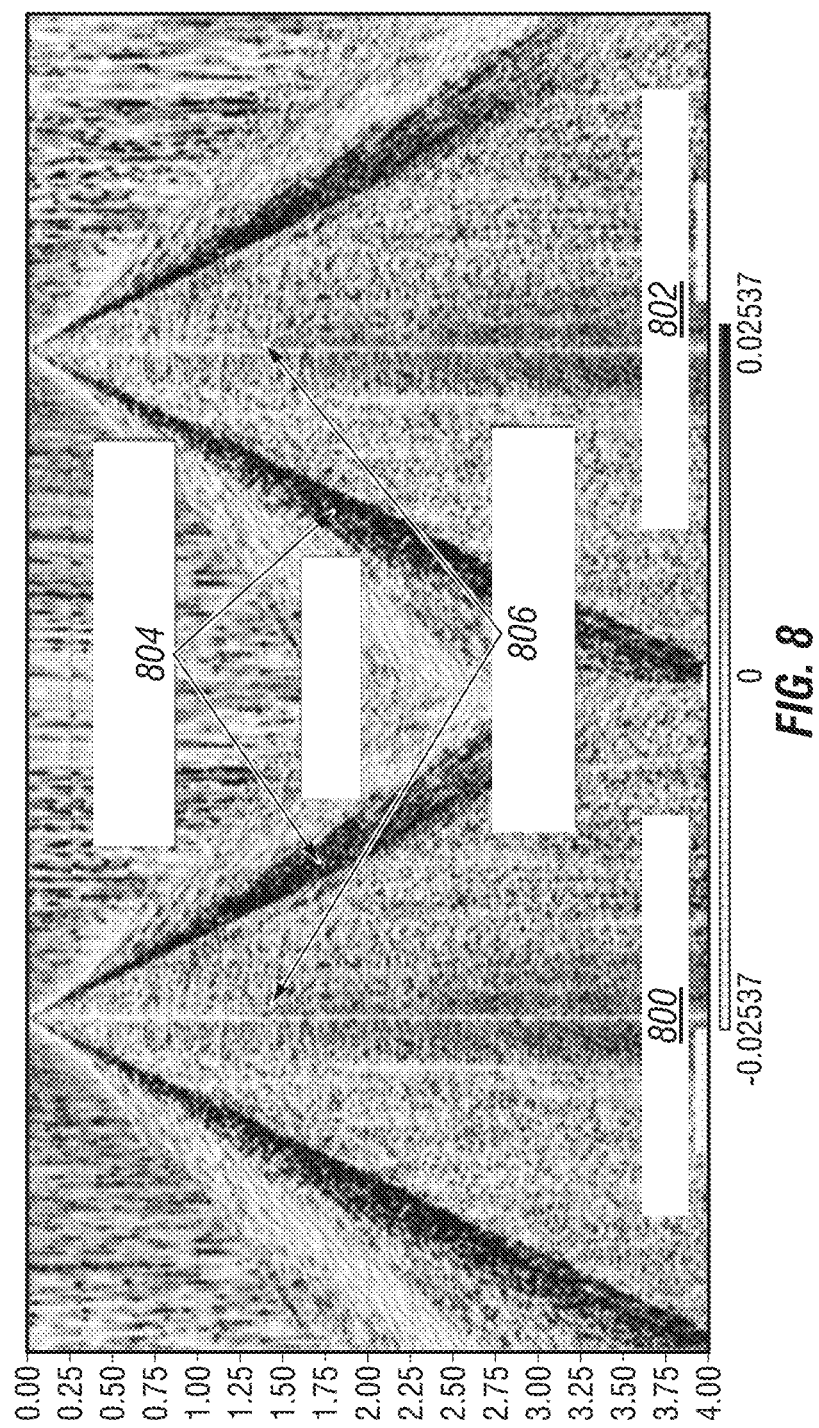
FIG. 8 depicts the ellipticity ratio derived from hydrophone data and geophone data after using a constant scaling on the hydrophone data in accordance with an embodiment of the disclosure.

Next, the raw hydrophone component and raw vertical geophone component of the multicomponent seismic data may be scaled (block 606). FIG. 8 depicts the scaling of the example multicomponent seismic data of FIG. 7 using a constant scaling. FIG. 8 depicts the ellipticity ratio derived from hydrophone data (800) and geophone data (802) after applying a constant scaling on the hydrophone data. As will be appreciated, although the scale of ellipticity ratio in FIG. 8 includes negative values, the negative values are an artifact of the illustration. The actual values of the ellipticity ratio are positive and within the range of 0 to 0.02537 in the example shown in FIG. 8.

As shown in FIG. 8, the guided waves 804 in the scaled hydrophone data (800) and scaled vertical geophone data (802) exhibit a relatively large ellipticity ratio. As also shown in FIG. 8, the reflections arrivals 806 (that is, desired signal waves) in the scaled hydrophone data (800) and scaled vertical geophone data (802) exhibit a relatively small ellipticity ratio. The scaling may be removed after the application of polarization filtering to avoid any effect on the amplitude of the seismic signal in subsequent processing.

In some embodiments, a constant scaling is applied to both the hydrophone component data and the vertical geophone component data to enhance the ellipticity ratio of the guided waves and improve the contrast between the polarization attributes of desired signal waves (that is, reflection arrivals) and noise (guided waves). As will be appreciated, in other embodiments the scaling may depend on space and frequency. Such dependent scaling is associated with the relationship between the pressure gradient and velocity, as shown in Equation 1:

$$\nabla P = i\rho\omega V \qquad (1)$$

where ∇P is the pressure gradient, V is a vector of the particle velocity components, ω the circular frequency, ρ is the water density, and i is the imaginary number unit. As will be appreciated, scaling of the hydrophone component and vertical geophone component may use the space-frequency dependent scalars shown in Equation 1 and is related to the impedance of the medium (as defined by the ratio between stress and particle velocity).

Next, polarization filtering based on the ellipticity ratio and within a specific frequency band defined by a velocity constraint may be applied to the scaled hydrophone component and vertical geophone component to attenuate the guided waves (block 608). In contrast to Scholte waves that are confined in a relatively narrow and low frequency band, guided waves are characterized by broadband frequency content. As the application of polarization filtering (performed in the time-frequency domain) may cover a frequency band where signal waves and guided waves overlap, the polarization filtering is applied within specific frequency band defined by minimum and maximum velocities. As guided waves are dispersive, the minimum velocity (v1) and maximum velocity (v2) may be estimated from the low and high frequency limits from the phase velocity dispersion curve of the fundamental mode. This velocity constraint ensures that the polarization filtering is applied only within the region of the seismic data where guided waves are predominant. The minimum velocity (v1) is equal to the velocity of sound in water (about 1500 meters/second (m/s)) and may vary with water temperature and salinity. The maximum velocity (v2) may be the maximum phase velocity of the first mode dispersion curve towards low frequency. This maximum velocity (v2) may about 90% of the shear wave velocity of the water bottom layer. In some embodiments, the minimum velocity (v1) and maximum velocity (v2) may be estimated by measuring the apparent slopes of the lower and upper ends of the guided wave cone (for example, the cones 1004 shown in FIG. 10 and discussed infra).

Figure 10:
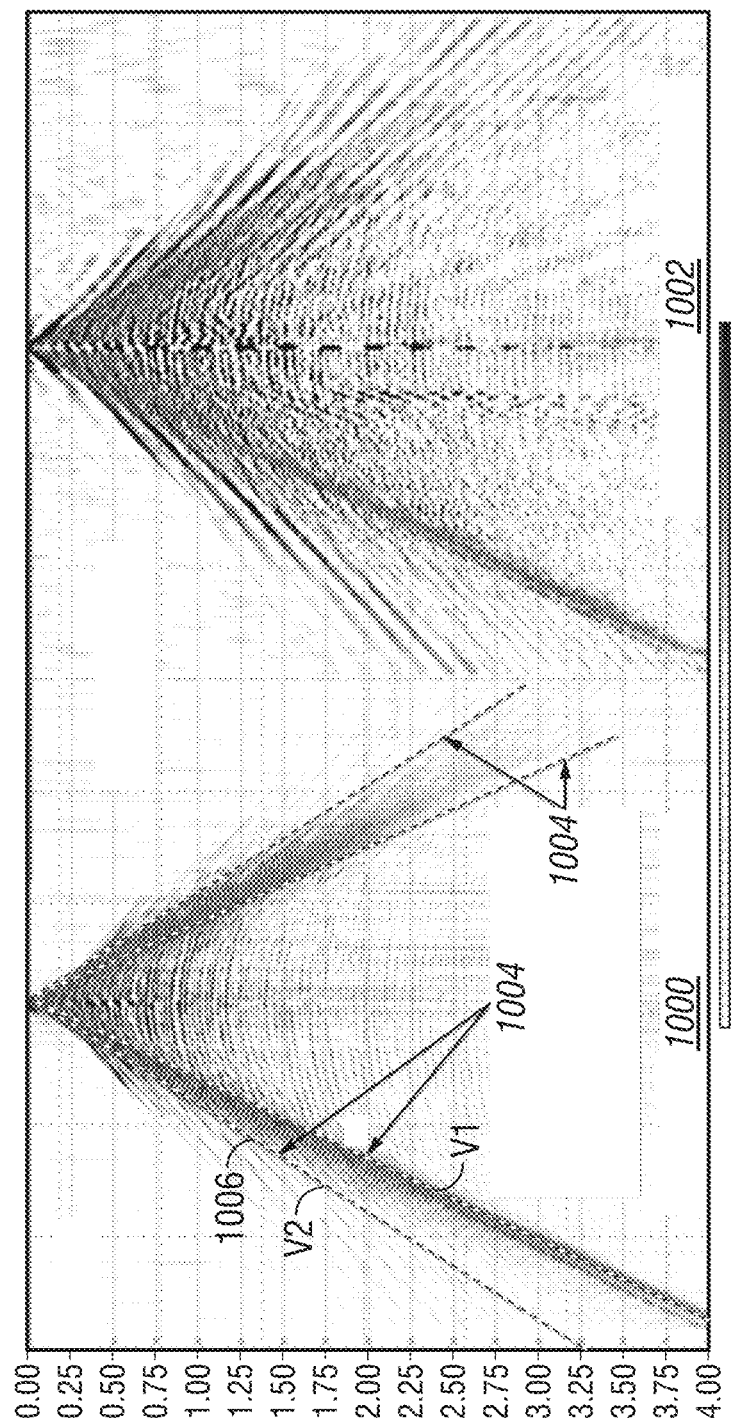
FIG. 10 depicts example raw receiver gathers for a hydrophone component and a vertical geophone component of multicomponent seismic data before the application of polarization filtering to attenuate the guided waves in the data in accordance with an embodiment of the disclosure.
Figure 11:
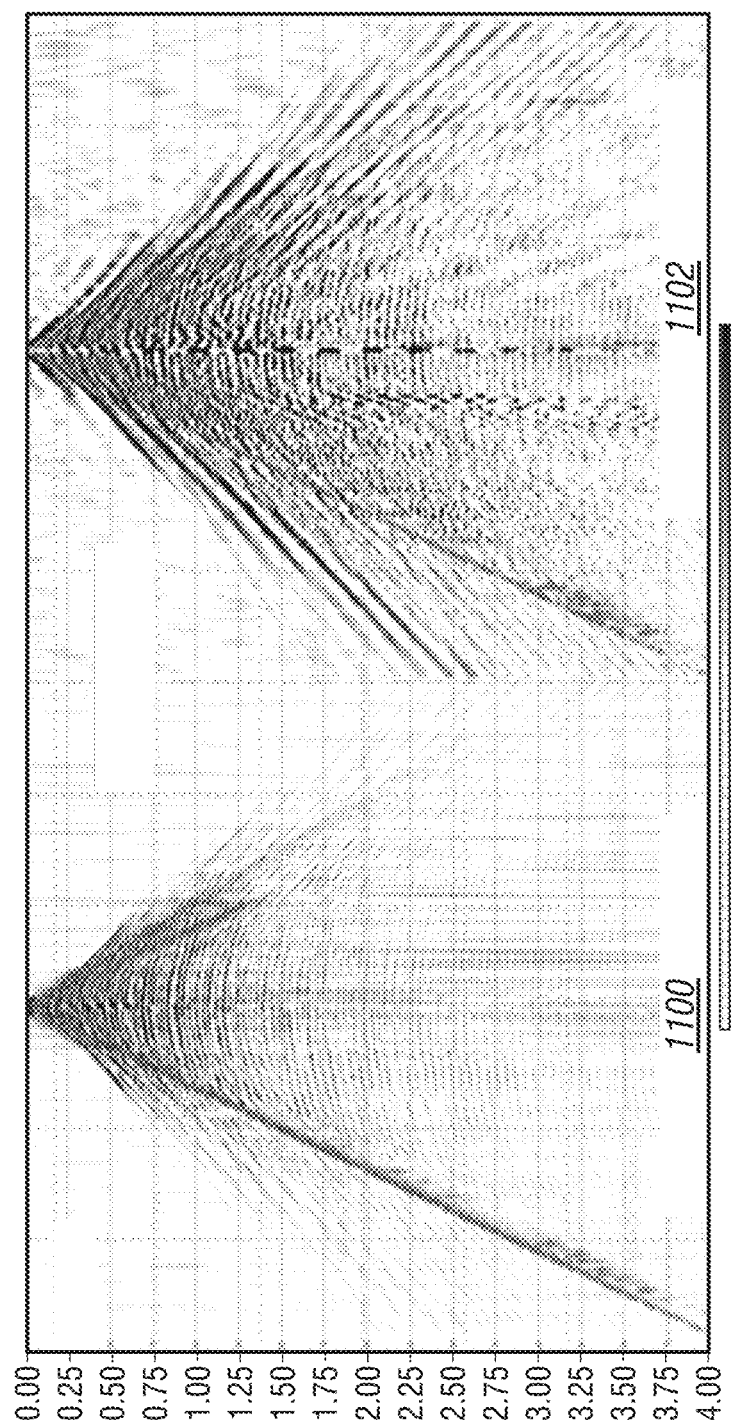
FIG. 11 depicts an example hydrophone component and vertical geophone component of multicomponent seismic data after the application of polarization filtering to attenuate the guided waves in accordance with an embodiment of the disclosure.
Figure 12:
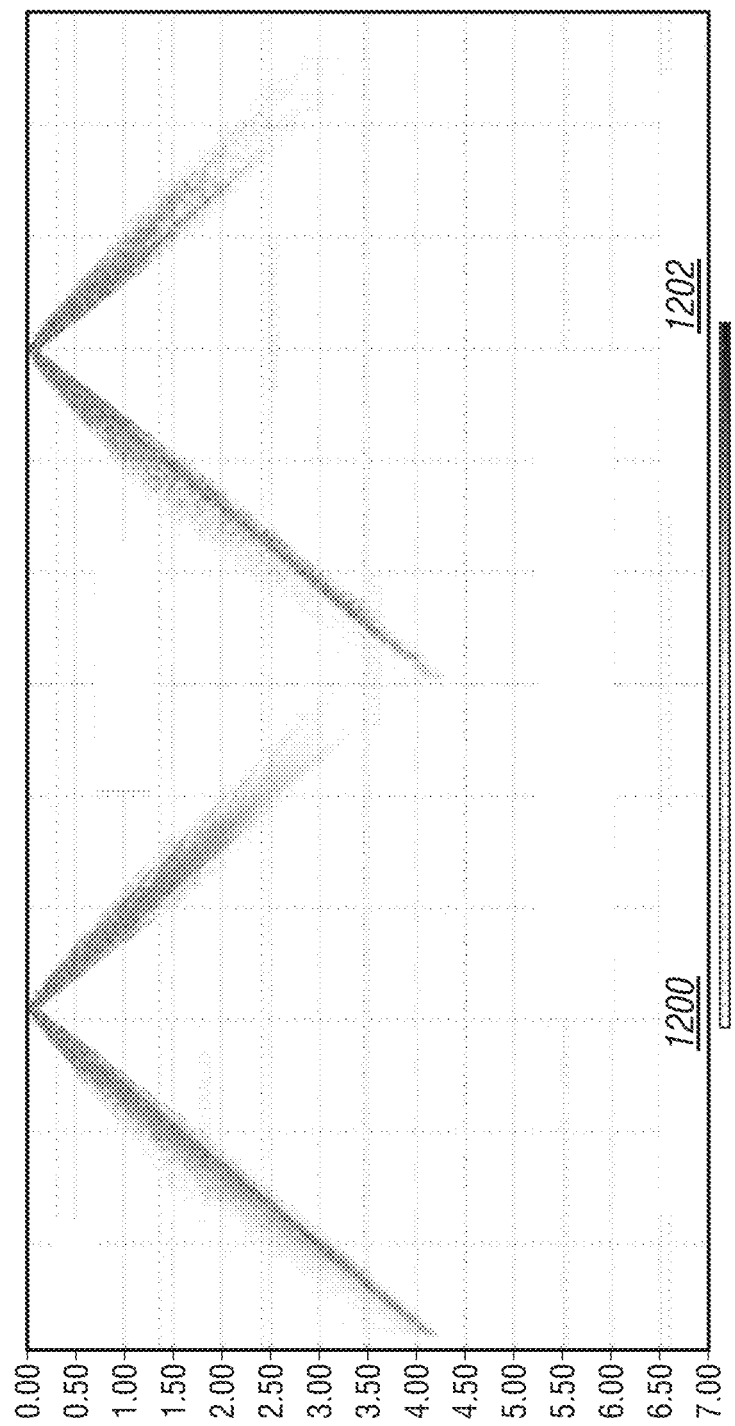
FIG. 12 depicts the differences in a hydrophone component and vertical geophone component generated by subtracting the raw hydrophone component and raw vertical geophone component shown in FIG. 10 from the attenuated hydrophone component and vertical geophone component shown in FIG. 11.

FIGS. 10-12 depict an example attenuation of guided waves in multicomponent seismic data using polarization filtering based on the ellipticity ratio. FIG. 10 depicts example raw receiver gathers for a hydrophone component (1000) and a vertical geophone component (1002) of multicomponent seismic data before application of polarization filtering to attenuate the guided waves in accordance with an embodiment of the disclosure. As shown in FIG. 10, the domain of application of the polarization filtering may be delimited by cones 1004 as defined by a minimum velocity 1006 (v1) and a maximum velocity 1008 (v2). The cones 1004 may delimit the application of polarization filtering in both the hydrophone component (1000) and vertical geophone component (1002).

FIG. 11 depicts the attenuated hydrophone component (1100) and vertical geophone (1102) after application of polarization filtering to attenuate the guided waves in accordance with an embodiment of the disclosure. As compared to the raw receiver gathers shown in FIG. 10, the guided waves are significantly attenuated resulting in a reduction of noise in the desired signal waves.

FIG. 12 depicts the differences in the hydrophone component (1200) and vertical geophone component (1202) generated by subtracting the raw hydrophone component (1000) and raw vertical geophone component (1002) shown in FIG. 10 from the attenuated hydrophone component (1100) and vertical geophone component (1102) shown in FIG. 11. FIG. 12 thus specifically depicts the noise attenuated via application of polarization filtering to the raw hydrophone component (1000) and raw vertical geophone component (1002) shown in FIG. 10.

After the polarization filtering, seismic data having a hydrophone component and vertical geophone component may be produced with attenuated noise from the guided waves (block 610). The attenuated seismic data may be used to generate a seismic image of a region of interest (for example, a subsea rock formation).

FIG. 6B depicts a process 612 for attenuating guided waves in multicomponent seismic data using polarization filtering based on the ellipticity ratio in accordance with an embodiment of the disclosure. Initially, raw multicomponent seismic data (for example, raw receiver gathers or traces) is obtained (block 614). The multicomponent seismic data may include a hydrophone component and a vertical geophone component, such as shown in FIG. 7 as discussed supra.

In some embodiments, polarization filtering may be applied to attenuate Scholte waves in the multicomponent seismic data (block 616) before the attenuation of guided waves. As discussed supra, polarization filtering using the ellipticity ratio may be applied to the raw hydrophone component and vertical geophone component to attenuation the Scholte waves. In other embodiments, the process 612 for attenuating guided waves may not include the attenuation of Scholte waves.

Figure 9:
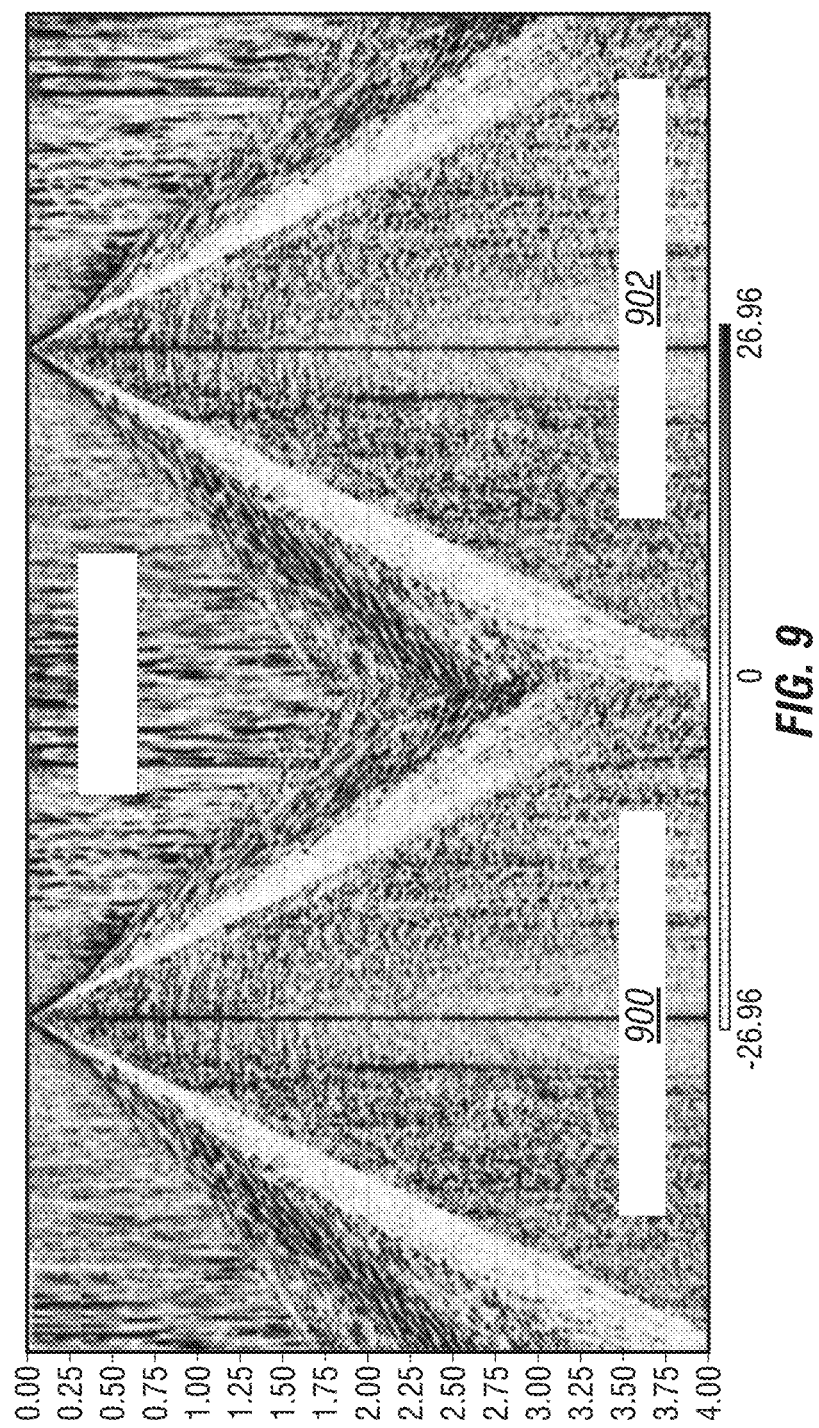
FIG. 9 depicts the tilt angles in example raw receiver gathers for a hydrophone component and a vertical geophone component of multicomponent seismic data in accordance with an embodiment of the disclosure.

In the embodiment shown in FIG. 6B, the tilt angle is be used as the basis for polarization filtering. Thus, in some embodiments, polarization filtering based on the tilt angle and within a specific frequency band defined by a velocity constraint may be applied to the raw hydrophone component and raw vertical geophone component to attenuate the guided waves (block 618). Tilt angle may be a suitable attribute because it is predominantly recorded in the hydrophone while the signal waves are recorded in both the hydrophone and geophone components. Consequently, the range of tilt angles derived from the raw multicomponent seismic data (that is, hydrophone (pressure sensor) and vertical geophone) will cluster around extreme values (for example, 0° or) 90° for the guided waves and away from these extreme values for the compressional waves. FIG. 9 depicts the tilt angles in example raw receiver gathers for a hydrophone component (900) and a vertical geophone component (902) of multicomponent seismic data.

After the polarization filtering, seismic data having a hydrophone component and vertical geophone component may be produced with attenuated noise from the guided waves (block 620). As noted in the disclosure, the attenuated seismic data may be used to generate a seismic image of a region of interest (for example, a subsea rock formation).

In some embodiments the guided waves in the multicomponent seismic data may be attenuated using a sequential combination of polarization filtering based on the ellipticity ratio applied to the scaled hydrophone and vertical geophone components and polarization filtering based on the tilt angle. FIG. 6C depicts a process 622 for attenuating guided waves in multicomponent seismic data using a first pass of polarization filtering based on the ellipticity ratio and a second pass of polarization filtering based on the tilt angle in accordance with an embodiment of the disclosure. Initially, raw multicomponent seismic data (for example, raw receiver gathers or traces) is obtained (block 624). The multicomponent seismic data may include a hydrophone component and a vertical geophone component, such as shown in FIG. 7 as discussed supra.

Here again, in some embodiments, polarization filtering may be applied to attenuate Scholte waves in the multicomponent seismic data (block 626) before the attenuation of guided waves. As discussed supra, polarization filtering using the ellipticity ratio may be applied to the raw hydrophone component and vertical geophone component to attenuation the Scholte waves. In other embodiments, the process 622 for attenuating guided waves may not include the attenuation of Scholte waves.

Next, the raw hydrophone component and raw vertical geophone component of the multicomponent seismic data may be scaled (block 628), such as shown in FIG. 8 and as discussed supra. After scaling the multicomponent seismic data, polarization filtering based on the ellipticity ratio and within a specific frequency band defined by a velocity constraint may be applied to the scaled hydrophone component and vertical geophone component to attenuate the guided waves (block 632), as shown in FIGS. 10-12 and as discussed with respect to the process 600.

After the application of polarization filtering based on the ellipticity ratio, a second pass of polarization filtering may be applied to the attenuated seismic data, such as to attenuate residual guided wave noise. As shown in FIG. 6C, polarization filtering based on the tilt angle and within a specific frequency band defined by a velocity constraint may be applied to the attenuated hydrophone component and raw vertical geophone component to attenuate residual guided waves (block 632)

After the two passes of polarization filtering, seismic data having a hydrophone component and vertical geophone component may be produced with attenuated noise from the guided waves (block 634). As noted in the disclosure, the attenuated seismic data may be used to generate a seismic image of a region of interest (for example, a subsea rock formation).

In some embodiments the guided waves in the multicomponent seismic data may be attenuated using a sequential combination of polarization filtering based on the tilt angle applied to the raw hydrophone and vertical geophone components and polarization filtering based on the ellipticity ratio. FIG. 6D depicts a process 636 for attenuating guided waves in multicomponent seismic data using a first pass of polarization filtering based on the ellipticity ratio and a second pass of polarization filtering based on the tilt angle in accordance with an embodiment of the disclosure. Initially, raw multicomponent seismic data (for example, raw receiver gathers or traces) is obtained (block 638). The multicomponent seismic data may include a hydrophone component and a vertical geophone component, such as shown in FIG. 7 as discussed supra.

In some embodiments, polarization filtering may be applied to attenuate Scholte waves in the multicomponent seismic data (block 640) before the attenuation of guided waves. As discussed supra, polarization filtering using the ellipticity ratio may be applied to the raw hydrophone component and vertical geophone component to attenuation the Scholte waves. In other embodiments, the process 636 for attenuating guided waves may not include the attenuation of Scholte waves.

Next, polarization filtering based on the tilt angle and within a specific frequency band defined by a velocity constraint may be applied to the raw hydrophone component and raw vertical geophone component to attenuate the guided waves (block 642), as discussed with regard to the process 612. After the application of polarization filtering based on the tilt angle, a second pass of polarization filtering may be applied to the attenuated seismic data, such as to attenuate residual guided wave noise. As shown in FIG. 6D, the attenuated hydrophone component and raw vertical geophone component of the multicomponent seismic data may be scaled (block 644), such as by using a constant scalar as discussed in the disclosure and similar to that illustrated in FIG. 8. After scaling the attenuated seismic data, polarization filtering based on the ellipticity ratio and within a specific frequency band defined by a velocity constraint may be applied to the scaled hydrophone component and vertical geophone component to attenuate the residual guided waves (block 646), as shown in FIGS. 10-12 and as discussed with respect to the process 600.

After the two passes of polarization filtering, seismic data having a hydrophone component and vertical geophone component may be produced with attenuated noise from the guided waves (block 648). As noted in the disclosure, the attenuated seismic data may be used to generate a seismic image of a region of interest (for example, a subsea rock formation).

Advantageously, embodiments of the disclosure avoid the use of multichannel filtering approaches which are affected by spatial aliasing. Additionally, the use of multichannel filtering may introduce a smearing effect and adversely affect the preservation of the relative amplitude variation of reflection arrivals with offsets required for seismic inversion approaches. The embodiments described in the disclosure are not affected by aliasing and do not introduce the amplitude smearing across offsets because the attenuation is performed using receivers recording at the same spatial location and filtering is performed on each multicomponent receiver station independently.

Figure 13:
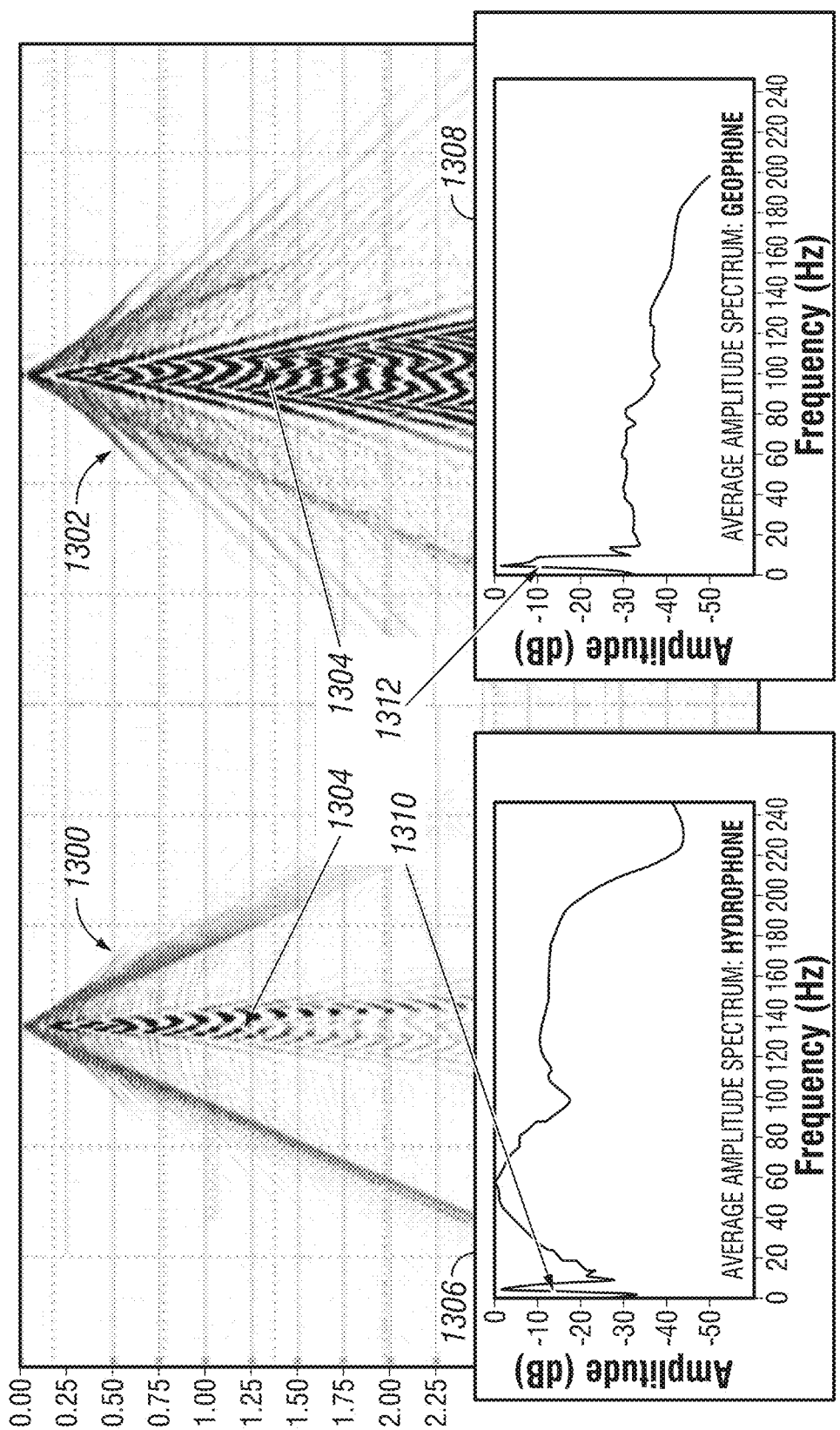
FIG. 13 depicts example raw receiver gathers for a hydrophone component and a vertical geophone component of multicomponent seismic data illustrating Scholte waves in accordance with an embodiment of the disclosure.
Figure 14:
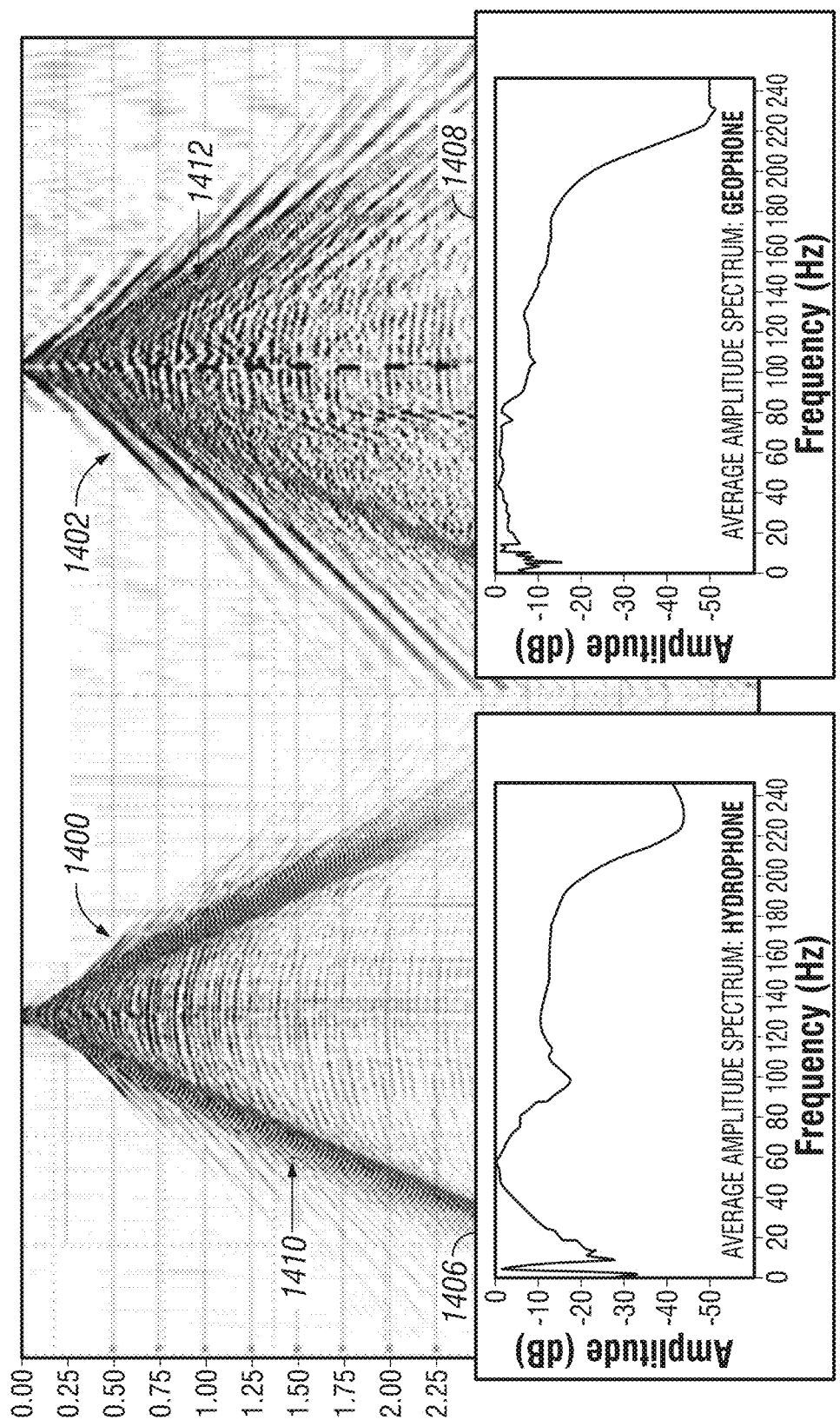
FIG. 14 depicts an example hydrophone component and vertical geophone component of multicomponent seismic data after the attenuation of Scholte waves using polarization filtering in accordance with an embodiment of the disclosure.
Figure 15:
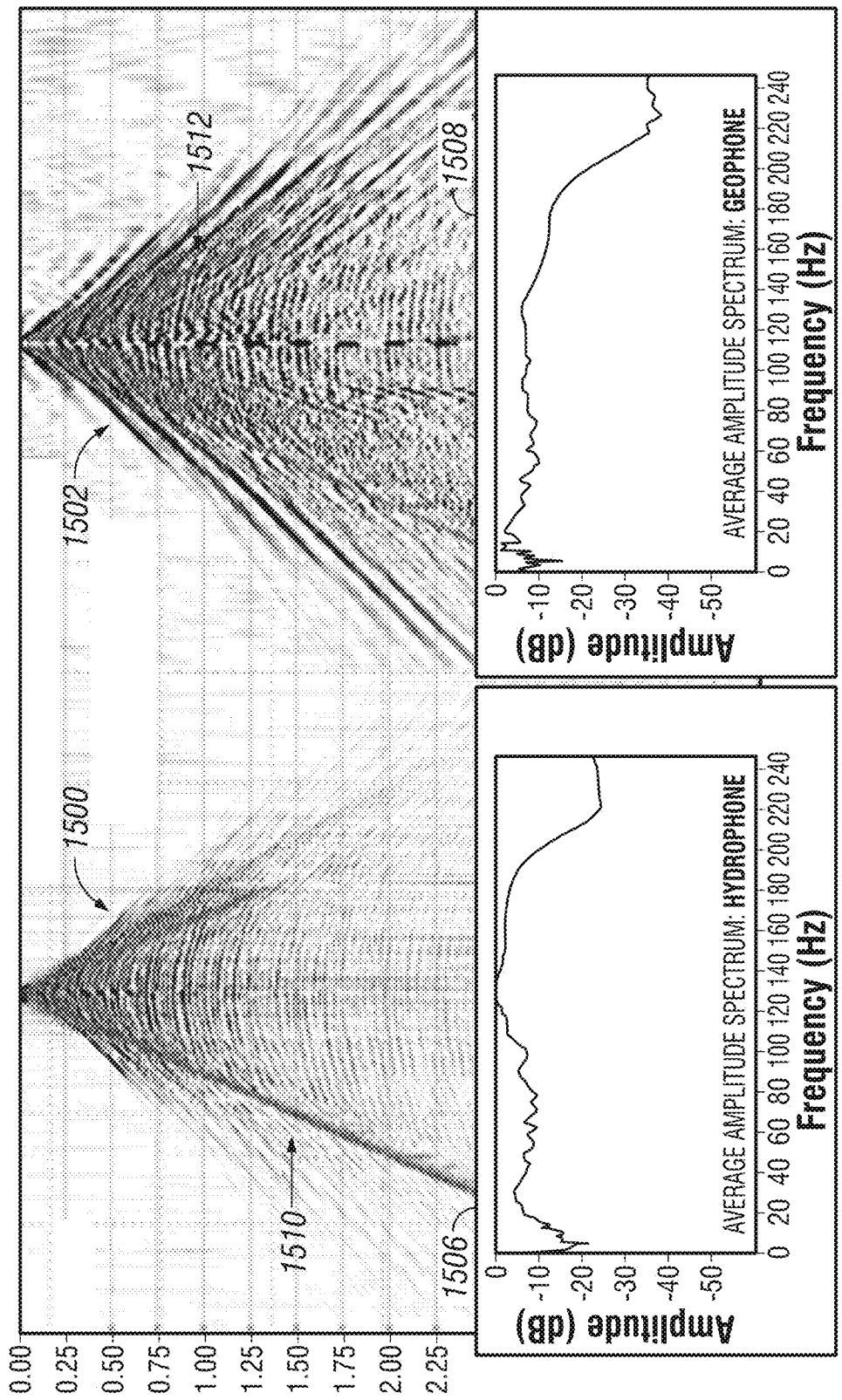
FIG. 15 depicts an example hydrophone component and vertical geophone component of multicomponent seismic data after attenuation of guided waves using polarization filtering in accordance with an embodiment of the disclosure.

FIGS. 13-15 depict the impact of the Scholte wave and guided wave attenuation described in the disclosure on the average spectrum of multicomponent seismic data in accordance with an example embodiment of the disclosure.

FIG. 13 depicts example raw receiver gathers for a hydrophone component (1300) and a vertical geophone component (1302) of multicomponent seismic data illustrating Scholte waves 1304 (that is, Scholte waves' arrivals) in accordance with an embodiment of the disclosure. The average amplitude spectrum for the hydrophone component (1300) is depicted in inset 1306. The average amplitude spectrum for the vertical geophone component (1302) is depicted in inset 1308. The narrow band and relatively large amplitude signature for the Scholte waves in the average amplitude spectrum the hydrophone component (1300) is highlighted by arrow 1310. The narrow band and relatively large amplitude signature for the Scholte waves in the average amplitude spectrum for the vertical geophone component (1302) is highlighted by arrow 1312.

FIG. 14 depicts an example hydrophone component (1400) and vertical geophone component (1402) of multicomponent seismic data after the attenuation of Scholte waves using polarization filtering in accordance with an embodiment of the disclosure. The average amplitude spectrum for the hydrophone component (1400) is depicted in inset 1406. The average amplitude spectrum for the vertical geophone component (1402) is depicted in inset 1408. As shown in FIG. 14, there is an absence of the low frequency and low velocity dispersive noise arrivals of the Scholte wave in the hydrophone component (1400) and vertical geophone component (1402). As shown in the insets 1406 and 1408, there is a corresponding absence of the low frequency peak (visible in FIG. 13) of the Scholte waves in the average amplitude spectrum. The average amplitude spectrum for the hydrophone component (1400) also shows a frequency dip around 100 Hz resulting from a side source ghost that may, in some embodiments, be addressed by deghosting. FIG. 14 also depicts the guided waves (shown by arrows 1410 and 1412) that remain in the hydrophone component (1400) and vertical geophone component (1402) and are not attenuated by the polarization filtering applied to the Scholte waves.

FIG. 15 depicts an example hydrophone component (1500) and vertical geophone component (1502) of multi-component seismic data after the attenuation of guided waves using polarization filtering based on the ellipticity ratio in accordance with an embodiment of the disclosure. The average amplitude spectrum for the hydrophone component (1500) is depicted in inset 1506. The average amplitude spectrum for the vertical geophone component (1502) is depicted in inset 1508. The arrows 1510 and 1512 shown in FIG. 15 illustrate the enhanced desired signal (that is, reflection arrivals) recovery after the attenuation of guided waves. A comparison between the average amplitude spectra 1406 and 1408 shown in FIG. 14 and the average amplitude spectra 1506 and 1508 shown in FIG. 15 indicates that the contribution of the guided waves is significant in the frequency band where relatively strong signal arrivals are expected. As shown in the comparison, the amplitude overshoot above the −10 db level shown in the average power spectrum in insets 1506 and 1508 of FIG. 15 caused by guided wave arrivals is significantly reduced after the application of polarization filtering.

Figure 16:
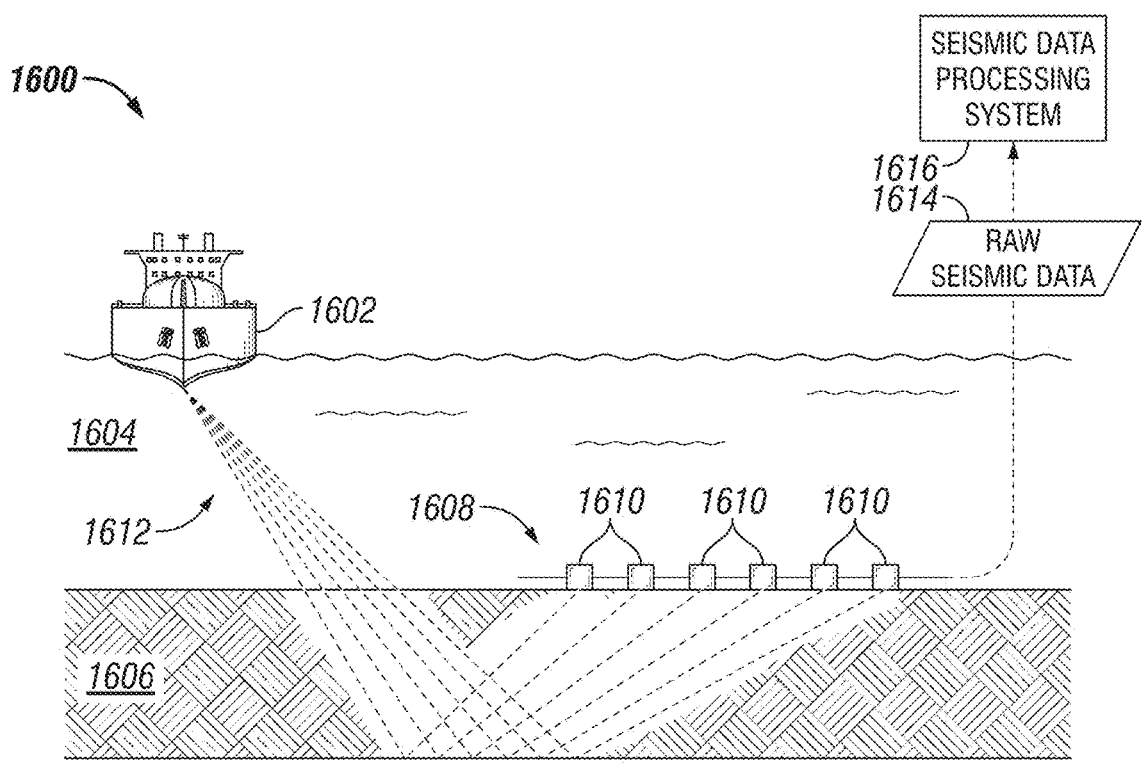
FIG. 16 is a schematic diagram of a simplified example seismic surveying system in a marine environment in accordance with an embodiment of the present disclosure.

FIG. 16 depicts a simplified example seismic surveying system 1600 in a marine environment in accordance with an embodiment of the present disclosure. The example seismic surveying system 1600 includes a seismic energy source (for example, one or more seismic shot stations) 1602 configured to emit seismic waves into the ocean 1604 and the earth 1606 to evaluate subsea and subsurface conditions and to detect possible concentrations of oil, gas, and other subsurface minerals. The example seismic surveying system 1600 also includes an ocean bottom cable (OBC) 1608 having seismic receiving stations (receivers) 1610, such as hydrophones and geophones. It should be appreciated that the number and position of the ocean bottom cable, hydrophones, and geophones are simplified for illustration and may vary in different configurations and systems. In other embodiments, the example seismic surveying system 1600 may include one or more ocean bottom nodes (OBN) having seismic receiving stations (receivers) such as hydrophones and geophones.

Accordingly, the hydrophones and geophones may be positioned to receive and record seismic energy data or seismic field records in any form including, but not limited to, a geophysical time series recording of the acoustic reflection and refraction of waveforms that travel from the seismic energy source 1602 to the hydrophones and geophones. Variations in the travel times of reflection and refraction events in one or more field records in seismic data processing can be processed to produce a seismic image that demonstrates subsurface structure and can be used to aid in the search for, and exploitation of, subsurface mineral deposits.

The geophones are seismic energy sensors that convert ground movement (or displacement of the ground) into voltage which may be recorded at a recording station. A deviation of the measured voltage from a base line measured voltage produces a seismic response which can be analyzed and processed to produce a seismic image of subsurface geophysical structures. As known in the art, the geophones are constrained to respond to a single dimension—typically the vertical dimension. Thus, the geophones may be used to record seismic energy waves reflected by the subsurface geology, such as subsurface formations in the earth 1606.

The hydrophones are seismic energy sensors for underwater recording of seismic energy data or seismic field records. In some embodiments, the hydrophones may be piezoelectric transducers, as is known and understood by those skilled in the art, that generate electricity when subjected to a pressure change. Such piezoelectric transducers may convert a seismic energy signal into an electric signal, as seismic energy signals are a pressure wave in fluids.

As mentioned above, the hydrophones and geophones may be positioned to receive and record seismic energy data or seismic field records in any form, such as a geophysical time series recording of the acoustic reflection and refraction of waveforms that travel from the seismic energy source 1602. The variations in the travel times of reflection and refraction events in one or more field records in a plurality of seismic signals may be used to produce a seismic image that demonstrates subsurface structure. As discussed in the disclosure, guided waves may be generated in an acoustic medium (the ocean 1604) overlying an elastic medium (the earth 1606) using multicomponent receivers 1610 (geophones and hydrophones) located at the interface of the acoustic and elastic mediums. The guided waves result from constructive interference of acoustic waves reflected at the acoustic/elastic medium interface (that is, the water bottom where the receivers are located) and at the water/air interface (that is, the, free surface of the ocean).

Each of the seismic receiving stations 1610 receives seismic signals 1612 and generates raw seismic data 1614 representing the seismic signals. Any number of seismic receiving stations 1610 may be used. In certain embodiments, the seismic receiving stations 1610 are positioned in a substantially linear array, each receiving station being spaced from adjacent real receiving stations at equal intervals; such positioning can be defined or adjusted according to particular considerations, needs, and constraints known by those having skill in the art.

The seismic receiving stations 1610 of the ocean bottom cable 1608 may be in communication with a seismic data processing system 1616 that receives the raw seismic data 1614 and attenuations guided waves (and, in some embodiments, Scholte waves) in accordance with embodiments of the disclosure. In some embodiments, the hydrophones and geophones may transmit data to the seismic data processing system 1616 using a wired connection or wireless connection (such as via antennae for transmitting and receiving wireless communication signals.

Figure 17:
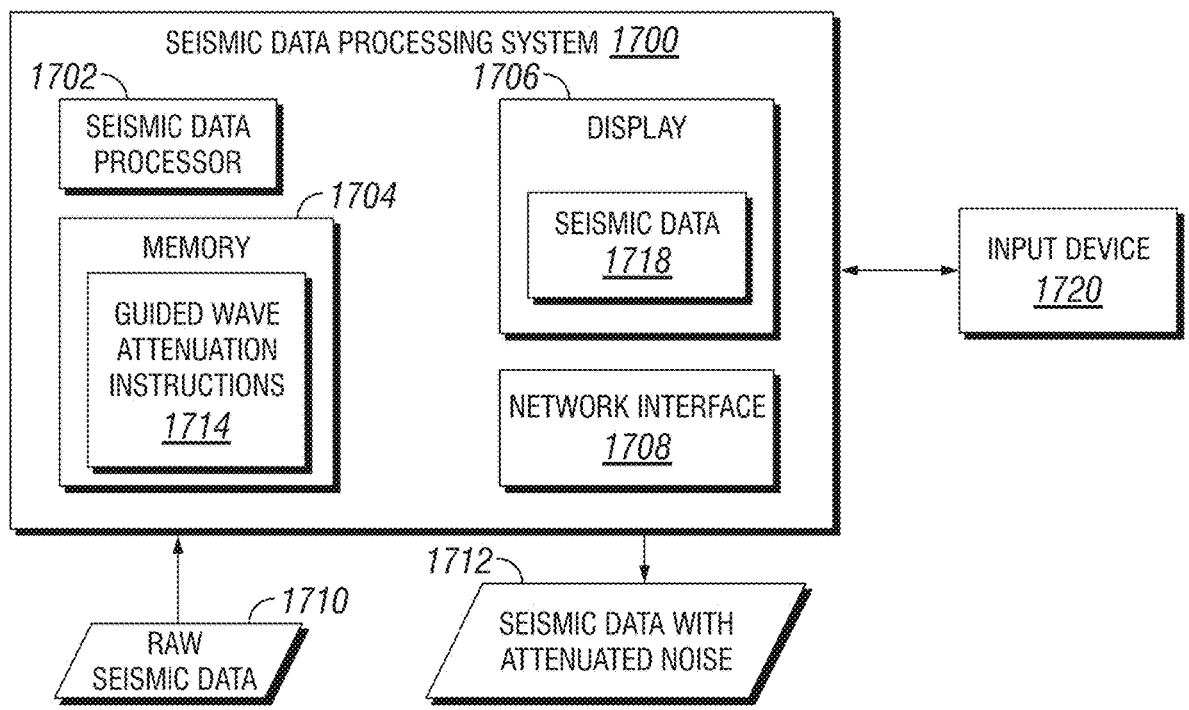
FIG. 17 is a block diagram of a seismic data processing system in accordance with an embodiment of the disclosure.

FIG. 17 depicts components of a seismic data processing system 1700 in accordance with an embodiment of the disclosure. In some embodiments, the seismic data processing system 1700 may be in communication with other components of a system for obtaining and producing seismic data. Such other components may include, for example, seismic shot stations (sources) and seismic receiving stations (receivers). As shown in FIG. 17, the seismic data processing system 1700 may include a seismic data processor 1702, a memory 1704, a display 1706, and a network interface

1708. It should be appreciated that the seismic data processing system 1700 may include other components that are omitted for clarity. In some embodiments, seismic data processing system 1700 may include or be a part of a cloud-computing system, a data center, a server rack or other server enclosure, a server, a virtual server, a desktop computer, a laptop computer, a tablet computer, or the like.

The seismic data processor 1702 (as used the disclosure, the term "processor" encompasses microprocessors) may include one or more processors having the capability to receive and process seismic data, such as data received from seismic receiving stations. In some embodiments, the seismic data processor 1702 may include an application-specific integrated circuit (AISC). In some embodiments, the seismic data processor 1702 may include a reduced instruction set (RISC) processor. Additionally, the seismic data processor 1702 may include a single-core processors and multicore processors and may include graphics processors. Multiple processors may be employed to provide for parallel or sequential execution of one or more of the techniques described in the disclosure. The seismic data processor 1702 may receive instructions and data from a memory (for example, memory 1704).

The memory 1704 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory 1704 may be accessible by the seismic data processor 1702. The memory 1704 may store executable computer code. The executable computer code may include computer program instructions for implementing one or more techniques described in the disclosure. For example, the executable computer code may include guided wave attenuation instructions 1714 to implement one or more embodiments of the present disclosure. In some embodiments, the guided wave attenuation instructions 1714 may implement one or more elements of process 600 described above and illustrated in FIG. 6. In some embodiments, the guided wave attenuation instructions 1714 may receive, as input, raw seismic data 1710 and provide, as output, seismic data 1712 with attenuated noise (for example, attenuation guided waves and, in some embodiments, attenuated Scholte waves). The seismic data 1712 may be stored in the memory 1704.

The display 1706 may include a cathode ray tube (CRT) display, liquid crystal display (LCD), an organic light emitting diode (OLED) display, or other suitable display. The display 1706 may display a user interface (for example, a graphical user interface). In accordance with some embodiments, the display 1706 may be a touch screen and may include or be provided with touch sensitive elements through which a user may interact with the user interface. In some embodiments, the display 1706 may display seismic data 1718, such the seismic data generated by the guided wave attenuation instructions 1710 in accordance with the techniques described herein.

The network interface 1708 may provide for communication between the seismic data processing system 1700 and other devices. The network interface 1708 may include a wired network interface card (NIC), a wireless (e.g., radio frequency) network interface card, or combination thereof. The network interface 1708 may include circuitry for receiving and sending signals to and from communications networks, such as an antenna system, an RF transceiver, an amplifier, a tuner, an oscillator, a digital signal processor, and so forth. The network interface 1708 may communicate with networks, such as the Internet, an intranet, a wide area network (WAN), a local area network (LAN), a metropolitan area network (MAN) or other networks. Communication over networks may use suitable standards, protocols, and technologies, such as Ethernet Bluetooth, Wireless Fidelity (Wi-Fi) (e.g., IEEE 802.11 standards), and other standards, protocols, and technologies. In some embodiments, for example, the raw seismic data 1710 may be received over a network via the network interface 1708. In some embodiments, for example, the seismic data 1712 may be provided to other devices over the network via the network interface 1708.

In some embodiments, seismic data processing computer may be coupled to an input device 1720 (for example, one or more input devices). The input devices 1720 may include, for example, a keyboard, a mouse, a microphone, or other input devices. In some embodiments, the input device 1720 may enable interaction with a user interface displayed on the display 1706. For example, in some embodiments, the input devices 1720 may enable the entry of inputs that control the acquisition of seismic data, the processing of seismic data, and so on.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A computer-implemented method for producing attenuated seismic data from raw seismic data generated from seismic receiver station configured to sense seismic signals originating from a seismic source station, the seismic receiver station comprising a geophone and a hydrophone, the method comprising:

obtaining raw seismic data from the seismic receiver station, the raw seismic data comprising a hydrophone component and a vertical geophone component;

scaling the raw seismic data to produce scaled seismic data comprising a scaled hydrophone component and a scaled vertical geophone component;

applying polarization filtering within a frequency band defined by a first velocity and a second velocity to the scaled seismic data, the polarization filtering based on an ellipticity ratio, such that the polarization filtering attenuates guided waves in the scaled seismic data; and producing attenuated seismic data from the application of polarization filtering, the attenuated seismic data having attenuated guided waves as compared to the raw seismic data.

2. The method of claim 1, comprising generating a seismic image from the attenuated seismic data.

3. The method of claim 1, comprising removing the scaling from the attenuated seismic data.

4. The method of claim 1, wherein the scaling is performed using a constant scalar.

5. The method of claim 1, comprising applying polarization filtering to the raw seismic data before the scaling, such that polarization filtering attenuates Scholte waves in the raw seismic data.

6. The method of claim 1, comprising applying a polarization filtering to the attenuated seismic data within a frequency band defined by a third velocity and a fourth velocity and based on a tilt angle, such that the polarization filtering attenuates guided waves in the attenuated seismic data.

7. A non-transitory computer-readable storage medium having executable code stored thereon for producing attenuated seismic data from seismic data generated from a seismic receiver station configured to sense seismic signals originating from a seismic source station, the seismic receiver station comprising a geophone and a hydrophone, the executable code comprising a set of instructions that causes a processor to perform operations comprising:
obtaining raw seismic data from the seismic receiver station, the raw seismic data comprising a hydrophone component and a vertical geophone component;
scaling the raw seismic data to produce scaled seismic data comprising a scaled hydrophone component and a scaled vertical geophone component;
applying polarization filtering within a frequency band defined by a first velocity and a second velocity to the scaled seismic data, the polarization filtering based on an ellipticity ratio, such that the polarization filtering attenuates guided waves in the scaled seismic data; and
producing attenuated seismic data from the application of polarization filtering, the attenuated seismic data having attenuated guided waves as compared to the raw seismic data.

8. The non-transitory computer-readable storage medium of claim 7, the operations comprising generating a seismic image from the attenuated seismic data.

9. The non-transitory computer-readable storage medium of claim 7, the operations comprising removing the scaling from the attenuated seismic data.

10. The non-transitory computer-readable storage medium of claim 7, wherein the scaling is performed using a constant scalar.

11. The non-transitory computer-readable storage medium of claim 7, the operations comprising applying polarization filtering to the raw seismic data before the scaling, such that polarization filtering attenuates Scholte waves in the raw seismic data.

12. A system, comprising:
a seismic source station;
a seismic receiver station configured to sense seismic signals originating from the seismic source station, the seismic receiver station comprising a geophone and a hydrophone;
a seismic data processor;
a non-transitory computer-readable storage memory accessible by the seismic data processor and having executable code stored thereon for producing attenuated seismic data from seismic data generated from the seismic receiver station, the executable code comprising a set of instructions that causes the seismic data processor to perform operations comprising:
obtaining raw seismic data from the seismic receiver station, the raw seismic data comprising a hydrophone component and a vertical geophone component;
scaling the raw seismic data to produce scaled seismic data comprising a scaled hydrophone component and a scaled vertical geophone component;
applying polarization filtering within a frequency band defined by a first velocity and a second velocity to the scaled seismic data, the polarization filtering based on an ellipticity ratio, such that the polarization filtering attenuates guided waves in the scaled seismic data; and
producing attenuated seismic data from the application of polarization filtering, the attenuated seismic data having attenuated guided waves as compared to the raw seismic data.

13. The system of claim 12, the operations comprising generating a seismic image from the attenuated seismic data.

14. The system of claim 12, the operations comprising removing the scaling from the attenuated seismic data.

15. The system of claim 12, wherein the scaling is performed using a constant scalar.

16. The system of claim 12, the operations comprising applying polarization filtering to the raw seismic data before the scaling, such that polarization filtering attenuates Scholte waves in the raw seismic data.

17. A computer-implemented method for producing attenuated seismic data from raw seismic data generated from a seismic receiver station configured to sense seismic signals originating from a seismic source station, the seismic receiver station comprising a geophone and a hydrophone, the method comprising:
obtaining raw seismic data from the seismic receiver station, the raw seismic data comprising a hydrophone component and a vertical geophone component;
applying a polarization filtering to the raw seismic data within a frequency band defined by a first velocity and a second velocity and based on a tilt angle, such that the polarization filtering attenuates guided waves in the scaled seismic data; and
producing attenuated seismic data from the application of polarization filtering, the attenuated seismic data having attenuated guided waves as compared to the raw seismic data.

18. The method of claim 17, comprising generating a seismic image from the attenuated seismic data.

19. The method of claim 17, wherein the polarization filtering comprises a first polarization filtering, the method comprising applying a second polarization filtering to the raw seismic data before the first polarization filtering, such that the second polarization filtering attenuates Scholte waves in the raw seismic data.

20. The method of claim 17, comprising:
scaling the attenuated seismic data to produce scaled seismic data comprising a scaled hydrophone component and a scaled vertical geophone component;
applying polarization filtering within a frequency band defined by a third velocity and a fourth velocity to the scaled seismic data, the polarization filtering based on an ellipticity ratio, such that the polarization filtering attenuates guided waves in the scaled seismic data.

21. A non-transitory computer-readable storage medium having executable code stored thereon for producing attenuated seismic data from seismic data generated from a seismic receiver station configured to sense seismic signals originating from a seismic source station, the seismic receiver station comprising a geophone and a hydrophone, the executable code comprising a set of instructions that causes a processor to perform operations comprising:

obtaining raw seismic data from the seismic receiver station, the raw seismic data comprising a hydrophone component and a vertical geophone component;

applying a polarization filtering to the raw seismic data within a frequency band defined by a first velocity and a second velocity and based on a tilt angle, such that the polarization filtering attenuates guided waves in the scaled seismic data; and producing attenuated seismic data from the application of polarization filtering, the attenuated seismic data having attenuated guided waves as compared to the raw seismic data.

22. The non-transitory computer-readable storage medium of claim 21, the operations comprising generating a seismic image from the attenuated seismic data.

23. The non-transitory computer-readable storage medium of claim 21, wherein the polarization filtering comprises a first polarization filtering, the operations comprising applying a second polarization filtering to the raw seismic data before the first polarization filtering, such that the second polarization filtering attenuates Scholte waves in the raw seismic data.

24. A system, comprising:
a seismic source station;
a seismic receiver station configured to sense seismic signals originating from the seismic source station, the seismic receiver station comprising a geophone and a hydrophone;
a seismic data processor;
a non-transitory computer-readable storage memory accessible by the seismic data processor and having executable code stored thereon for producing attenuated seismic data from seismic data generated from the seismic receiver station, the executable code comprising a set of instructions that causes the seismic data processor to perform operations comprising:

obtaining raw seismic data from the seismic receiver station, the raw seismic data comprising a hydrophone component and a vertical geophone component;

applying a polarization filtering to the raw seismic data within a frequency band defined by a first velocity and a second velocity and based on a tilt angle, such that the polarization filtering attenuates guided waves in the scaled seismic data; and producing attenuated seismic data from the application of polarization filtering, the attenuated seismic data having attenuated guided waves as compared to the raw seismic data.

25. The system of claim 24, the operations comprising generating a seismic image from the attenuated seismic data.

26. The system of claim 24, wherein the polarization filtering comprises a first polarization filtering, the operations comprising applying a second polarization filtering to the raw seismic data before the first polarization filtering, such that the second polarization filtering attenuates Scholte waves in the raw seismic data.

* * * * *